US011656628B2

United States Patent
Herlant et al.

(10) Patent No.: US 11,656,628 B2
(45) Date of Patent: May 23, 2023

(54) LEARNED ESCAPE BEHAVIORS OF A MOBILE ROBOT

(71) Applicant: iRobot Corporation, Bedford, MA (US)

(72) Inventors: Laura V. Herlant, Arlington, MA (US); Aravindh Kuppusamy, Bedford, MA (US); Deepak Sharma, Burlington, MA (US); Kshitij Bichave, Bedford, MA (US); Shao Zhou, Los Angeles, CA (US); Cheuk Wah Wong, Concord, MA (US)

(73) Assignee: iRobot Corporation, Bedford, MA (US)

( * ) Notice: Subject to any disclaimer, the term of this patent is extended or adjusted under 35 U.S.C. 154(b) by 240 days.

(21) Appl. No.: 17/021,154

(22) Filed: Sep. 15, 2020

(65) Prior Publication Data
US 2022/0083066 A1 Mar. 17, 2022

(51) Int. Cl.
G05D 1/02 (2020.01)
A47L 9/00 (2006.01)
A47L 9/28 (2006.01)

(52) U.S. Cl.
CPC ............ G05D 1/0221 (2013.01); A47L 9/009 (2013.01); A47L 9/2826 (2013.01); A47L 9/2852 (2013.01);
(Continued)

(58) Field of Classification Search
CPC .. G05D 1/0221; G05D 1/0242; G05D 1/0246; G05D 1/027; G05D 1/0272;
(Continued)

(56) References Cited

U.S. PATENT DOCUMENTS 8,417,383 B2 4/2013 Ozick et al.
9,457,471 B2 10/2016 Schnittman et al.
(Continued)

FOREIGN PATENT DOCUMENTS

WO 02101477 12/2002
WO 2019241680 12/2019
WO WO-2022060521 A1 3/2022

OTHER PUBLICATIONS

"International Application Serial No. PCT US2021 046700, International Search Report dated Nov. 8, 2021", 4 pgs.
(Continued)

*Primary Examiner* — Bao Long T Nguyen
(74) *Attorney, Agent, or Firm* — Schwegman Lundberg & Woessner, P.A.

(57) ABSTRACT

Described herein are systems, devices, and methods for controlling a mobile cleaning robot to escape from a stuck state using a learned robot escape behavior model. The model is trained using reinforcement learning at a cloud-computing device or networked devices. A mobile cleaning robot comprises a drive system, a sensor circuit to collect sensor data associated with a detected stuck state, and a controller circuit that can receive the trained robot escape behavior model, and apply the sensor data associated with the detected stuck state to the trained robot escape behavior model to determine an escape policy. The drive system or one or more actuators of the mobile robot can remove the mobile robot from the stuck state according to the determined escape policy.

36 Claims, 12 Drawing Sheets

(52) U.S. Cl.
CPC ............ *A47L 9/2894* (2013.01); *G05D 1/027* (2013.01); *G05D 1/0242* (2013.01); *G05D 1/0246* (2013.01); *G05D 1/0272* (2013.01); *A47L 2201/04* (2013.01); *G05D 2201/0215* (2013.01)

(58) Field of Classification Search
CPC ... G05D 2201/0215; G05D 2201/0203; G05D 1/0088; G05D 1/0214; G05D 1/0011; A47L 9/009; A47L 9/2826; A47L 9/2852; A47L 9/2894; A47L 2201/04; A47L 2201/06; G06N 20/00; B25J 9/163; B25J 9/1676

See application file for complete search history.

(56) References Cited

U.S. PATENT DOCUMENTS

| | | | |
|---|---|---|---|
| 2016/0103451 A1* | 4/2016 | Vicenti | G05D 1/0242 |
| | | | 700/259 |
| 2019/0197396 A1* | 6/2019 | Rajkumar | B25J 9/1671 |
| 2019/0378019 A1 | 12/2019 | Scheutz et al. | |
| 2020/0004260 A1* | 1/2020 | Kim | G05D 1/0274 |
| 2020/0174489 A1* | 6/2020 | Jung | G06N 99/00 |
| 2021/0114213 A1* | 4/2021 | Lee | A47L 9/2852 |

OTHER PUBLICATIONS

"International Application Serial No. PCT US2021 046700, Written Opinion dated Nov. 8, 2021", 5 pgs.
"International Application Serial No. PCT/US2021/046700, International Preliminary Report on Patentability dated Mar. 30, 2023", 7 pgs.

* cited by examiner

LEARNED ESCAPE BEHAVIORS OF A MOBILE ROBOT

TECHNICAL FIELD

This document relates generally to mobile robots, and more particularly to systems, devices, and methods for controlling a mobile robot to escape a stuck state.

BACKGROUND

Autonomous mobile robots can move about an environment, and perform several functions and operations in a variety of categories, including but not limited to security operations, infrastructure or maintenance operations, navigation or mapping operations, inventory management operations, and robot/human interaction operations. Some mobile robots, known as cleaning robots, can autonomously perform cleaning tasks within an environment, e.g., a home. Many kinds of cleaning robots are autonomous to some degree and in different ways. For example, a cleaning robot can conduct cleaning missions, where the robot traverses and simultaneously ingests (e.g., vacuums) debris from the floor surface of their environment.

A cleaning robot generally includes a pair of driving wheels located at both lower sides of a body of the cleaning robot to move the cleaning robot, and a caster to support the body such that the body may move forward/backward or rotate within a region to be cleaned. In the environment through which the cleaning robot drives, obstacles, such as a step, an object having an inclined surface, and furniture, may be present. A robot, such as a cleaning robot with a body having a low height, may be stuck while moving about an environment, which prevents the mobile robot from driving. For example, when a cleaning robot enters a narrow space such as under a chair or a bed, the upper portion of the cleaning robot may be jammed, or a bottom portion of the cleaning robot body may be caught by an obstacle or a groove formed on the floor. In some instances, the cleaning robot may climb onto an obstacle that causes a driving wheel of the cleaning robot to be lifted up, putting the cleaning robot into an undrivable state. In some instances, while performing a cleaning mission, the cleaning rollers may ingest soft objects such as carpets, clothes, tapestry, or other textile fabrics on the floor. A wheel of the cleaning robot may be bound by such textile fabrics, causing the cleaning robot to be stuck in an undrivable state.

The stuck state can be resolved with a user intervention. It is desirable that the cleaning robot automatically detects and resolves the stuck state, such as escaping from such a state.

SUMMARY

This document describes systems, devices, and methods for controlling a mobile cleaning robot to escape from a detected stuck state using a trained robot escape behavior model. According to one example, a mobile cleaning robot comprises a drive system to move the mobile cleaning robot about an environment, a sensor circuit configured to collect sensor data associated with a detected stuck state that prevents the mobile cleaning robot from driving in the environment, and a controller circuit. The controller circuit can receive a trained robot escape behavior model being trained to establish a relationship between sensor data associated with one or more stuck states and respective escape policies each including an instruction or a set of instructions to the drive system or one or more actuators (e.g., a wheel motor, a side brush motor, or a vacuum brush or roller motor) of the mobile cleaning robot to get the mobile cleaning robot away from a corresponding stuck state. The robot escape behavior model may be trained at a cloud-computing device, or networked devices providing a cloud-based service of training or updating the robot escape behavior model, using reinforcement learning methodology. The controller of the mobile cleaning robot may apply the collected sensor data associated with the detected stuck state to the trained robot escape behavior model to determine an escape policy, and generate a control signal to the drive system or one or more of the actuators to escape from the stuck state in accordance with the determined escape policy.

Example 1 is a system comprising: a mobile cleaning robot, comprising: a drive system configured to move the mobile cleaning robot about an environment; a sensor circuit configured to collect sensor data associated with a stuck state preventing the mobile cleaning robot from driving in the environment; and a controller circuit configured to: receive a trained robot escape behavior model being trained to establish a relationship between (1) sensor data associated with one or more stuck states and (1 is missing parent: 2) respective escape policies each including an instruction to the drive system or one or more actuator of the mobile cleaning robot to get the mobile cleaning robot away from a corresponding stuck state; apply the collected sensor data associated with the stuck state to the trained robot escape behavior model to determine an escape policy; and generate a control signal to the drive system or an actuator to escape from the stuck state in accordance with the determined escape policy.

In Example 2, the subject matter of Example 1 optionally includes the sensor data for the trained robot escape behavior model that can include one or more of: displacement data collected by an optical mouse sensor; actuator motor data; wheel encoder data; wheel drop data; cliff infrared values collected by an infrared sensor; angular rate data collected by a gyroscope sensor; data collected by a bumper sensor; or data collected by an accelerometer.

In Example 3, the subject matter of any one or more of Examples 1-2 optionally includes the sensor data for the trained robot escape behavior model that can include image data collected by a camera sensor.

In Example 4, the subject matter of any one or more of Examples 1-3 optionally includes the sensor circuit that can be configured to collect the sensor data at a sampling rate of two samples per second.

In Example 5, the subject matter of any one or more of Examples 1-4 optionally includes the escape policies for the trained robot escape behavior model that can include recommended parameter values of at least one of a wheel motor parameter, a side brush motor parameter, or a vacuum brush or roller motor parameter.

In Example 6, the subject matter of any one or more of Examples 1-5 optionally includes a training module configured to: construct training data including sensor data associated with one or more stuck states, the sensor data collected from one or more mobile cleaning robots; and generate the trained robot escape behavior model using the constructed training data.

In Example 7, the subject matter of Example 6 optionally includes the training module in a remote computing device separate from and operatively in communication with the mobile cleaning robot; and the controller circuit of the mobile cleaning robot that can be configured to receive the trained robot escape behavior model from the remote computing device.

In Example 8, the subject matter of Example 7 optionally includes the remote computing device that can be a cloud-computing device or networked devices.

In Example 9, the subject matter of any one or more of Examples 6-8 optionally includes the training module that can be configured to: identify a robot cohort comprising mobile cleaning robots satisfying a robot grouping criterion; and construct the training data using sensor data collected from the identified robot cohort.

In Example 10, the subject matter of Example 9 optionally includes the training module that can be configured to identify the robot cohort comprising mobile cleaning robots of a specified robot model, type, or a geographical region of operation.

In Example 11, the subject matter of any one or more of Examples 9-10 optionally includes the training module that can be configured to identify the robot cohort comprising mobile cleaning robots with a specified number or range of days of operation.

In Example 12, the subject matter of any one or more of Examples 9-11 optionally includes the training module that can be configured to identify the robot cohort comprising mobile cleaning robots having a specified stuck occurrence rate or rate range.

In Example 13, the subject matter of any one or more of Examples 9-12 optionally includes the training module that can be configured to identify the robot cohort comprising mobile cleaning robots interacting with a specified type of obstacle associated with a stuck state.

In Example 14, the subject matter of any one or more of Examples 9-13 optionally includes the training module that can be configured to identify the robot cohort comprising mobile cleaning robots interacting with a specified type of obstacle at a specified location of an environment associated with a stuck state.

In Example 15, the subject matter of any one or more of Examples 9-14 optionally includes the training module that can be configured to identify one or more clusters of time series of sensor data collected from a plurality of mobile cleaning robots, and to construct the training data using the sensor data within an identified cluster.

In Example 16, the subject matter of any one or more of Examples 9-15 optionally includes: the training module configured to generate two or more trained robot escape behavior models for respective robot cohorts satisfying respective robot grouping criteria; and the controller circuit of the mobile cleaning robot configured to recognize the mobile cleaning robot as belong to one of the robot cohorts, and to apply the collected sensor data associated with the stuck state to one of the trained robot escape behavior models corresponding to the recognized robot cohort to determine the escape policy.

In Example 17, the subject matter of any one or more of Examples 6-16 optionally includes the trained robot escape behavior model that can include a neural network model.

In Example 18, the subject matter of any one or more of Examples 6-17 optionally includes the training module that can be configured to generate the trained robot escape behavior model using reinforcement learning including, for a target stuck state: assign respective numerical rewards to a plurality of candidate escape policies; and select, from the plurality of candidate escape policies, an escape policy that maximizes an expected value of the numerical rewards.

In Example 19, the subject matter of Example 18 optionally includes the reinforcement learning used for generating the trained robot escape behavior model that can include an on-policy learning algorithm.

In Example 20, the subject matter of any one or more of Examples 18-19 optionally includes the reinforcement learning used for generating the trained robot escape behavior model that can include an off-policy learning algorithm.

In Example 21, the subject matter of any one or more of Examples 18-20 optionally includes the training module configured to assign the respective numerical rewards based on at least one of: success or failure of escaping from the stuck state; an efficiency indicator of escaping from the stuck state; or time taken to escape from the stuck state.

In Example 22, the subject matter of any one or more of Examples 6-21 optionally includes a validation module configured to validate the trained robot escape behavior model against validation data different from the training data, and wherein the controller circuit of the mobile cleaning robot is configured to apply the collected sensor data associated with the stuck state to the validated robot escape behavior model to determine the escape policy if a validation criterion is satisfied.

In Example 23, the subject matter of Example 22 optionally includes the training module that can be configured to construct the training data using sensor data collected from first mobile cleaning robots during stuck-and-escape simulations; and the validation module that can be configured to construct the validation data using sensor data collected from second mobile cleaning robots, distinct from the first mobile robots, while performing cleaning missions in respective environments.

In Example 24, the subject matter of any one or more of Examples 22-23 optionally includes the training module that can be configured to construct the training data using sensor data collected from second mobile cleaning robots while performing cleaning missions in respective environments; and the validation module that can be configured to construct the validation data collected from first mobile cleaning robots, distinct from the second mobile robot, during stuck-and-escape simulations.

In Example 25, the subject matter of any one or more of Examples 6-24 optionally includes the training module that can be configured to update the trained robot escape behavior model periodically or responsive to a trigger event.

In Example 26, the subject matter of any one or more of Examples 1-25 optionally includes the controller circuit of the mobile cleaning robot that can be configured to update the received trained robot escape behavior model periodically or responsive to a trigger event.

In Example 27, the subject matter of any one or more of Examples 1-26 optionally includes a user interface configured to present to a user information about the stuck state and the robot escape behavior of the mobile cleaning robot from the stuck state.

Example 28 is a method of operating a mobile cleaning robot to manage a stuck event in an environment, the method comprising: collecting robot sensor data associated with a stuck state that prevents the mobile cleaning robot from driving in an environment; receiving a trained robot escape behavior model being trained to establish a relationship between (1) sensor data associated with one or more stuck states and (2) respective escape policies each including an instruction to get the mobile cleaning robot away from a corresponding stuck state; applying the collected sensor data associated with the stuck state to the trained robot escape behavior model to determine an escape policy; and generating a control signal to a drive system of the mobile cleaning robot or an actuator of the mobile cleaning robot to escape from the stuck state in accordance with the determined escape policy.

In Example 29, the subject matter of Example 28 optionally includes the escape policies for the trained robot escape behavior model that can include recommended parameter values of at least one of: a wheel motor parameter; a side brush motor parameter; or a vacuum brush or roller motor parameter.

In Example 30, the subject matter of any one or more of Examples 28-29 optionally includes: constructing training data including sensor data associated with one or more stuck states and collected from one or more mobile cleaning robots; and generating, via a cloud-computing system, the trained robot escape behavior model using the training data.

In Example 31, the subject matter of Example 30 optionally include constructing the training data, which can include identifying a robot cohort comprising a plurality of mobile cleaning robots satisfying a robot grouping criterion; and constructing the training data using sensor data collected from the identified robot cohort.

In Example 32, the subject matter of Example 31 optionally includes the robot cohort that can include at least one of: mobile cleaning robots of a specified robot model, type, or a geographical region of operation; mobile cleaning robots with a specified number or range of days of operation; mobile cleaning robots having a specified stuck occurrence rate or rate range; mobile cleaning robots interacting with a specified type of obstacle associated with a stuck state; or mobile cleaning robots interacting with a specified type of obstacle at a specified location of an environment associated with a stuck state.

In Example 33, the subject matter of any one or more of Examples 31-32 optionally includes identifying one or more clusters of time series of sensor data collected from a plurality of mobile cleaning robots, and constructing the training data using the sensor data within an identified cluster.

In Example 34, the subject matter of any one or more of Examples 31-33 optionally includes the trained robot escape behavior model that can include two or more behavior models for respective robot cohorts satisfying respective robot grouping criteria, the method further comprising: recognizing the mobile cleaning robot as belong to one of the robot cohorts; and applying the collected sensor data associated with the stuck state to one of the trained robot escape behavior models corresponding to the recognized robot cohort to determine the escape policy.

In Example 35, the subject matter of any one or more of Examples 30-34 optionally includes generating the trained robot escape behavior model that can include training the robot escape behavior model using reinforcement learning including, for a target stuck state: assigning respective numerical rewards to a plurality of candidate escape policies; and selecting, from the plurality of candidate escape policies, an escape policy that maximizes an expected value of the numerical rewards.

In Example 36, the subject matter of Example 35 optionally includes assigning the respective numerical rewards based on at least one of: success or failure of escaping from the stuck state; an efficiency indicator of escaping from the stuck state; or time taken to escape from the stuck state.

In Example 37, the subject matter of any one or more of Examples 30-36 optionally include validating the trained robot escape behavior model against validation data different from the training data, and applying the collected sensor data associated with the stuck state to the validated robot escape behavior model to determine the escape policy if a validation criterion is satisfied.

In Example 38, the subject matter of Example 37 optionally includes one of the training data or the validation data that can include sensor data collected from first mobile cleaning robots during stuck-and-escape simulations; and another of the training data or the validation data include sensor data collected from second mobile cleaning robots, distinct from the first mobile cleaning robots, while performing cleaning missions in respective environments.

In Example 39, the subject matter of any one or more of Examples 28-38 optionally includes updating the received trained robot escape behavior model periodically or responsive to a trigger event.

In Example 40, the subject matter of any one or more of Examples 28-39 optionally includes displaying on a user interface information about the stuck state and the robot escape behavior of the mobile cleaning robot from the stuck state.

This summary is an overview of some of the teachings of the present application and not intended to be an exclusive or exhaustive treatment of the present subject matter. Further details about the present subject matter are found in the detailed description and appended claims. Other aspects of the disclosure will be apparent to persons skilled in the art upon reading and understanding the following detailed description and viewing the drawings that form a part thereof, each of which are not to be taken in a limiting sense. The scope of the present disclosure is defined by the appended claims and their legal equivalents.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

Figure 1:
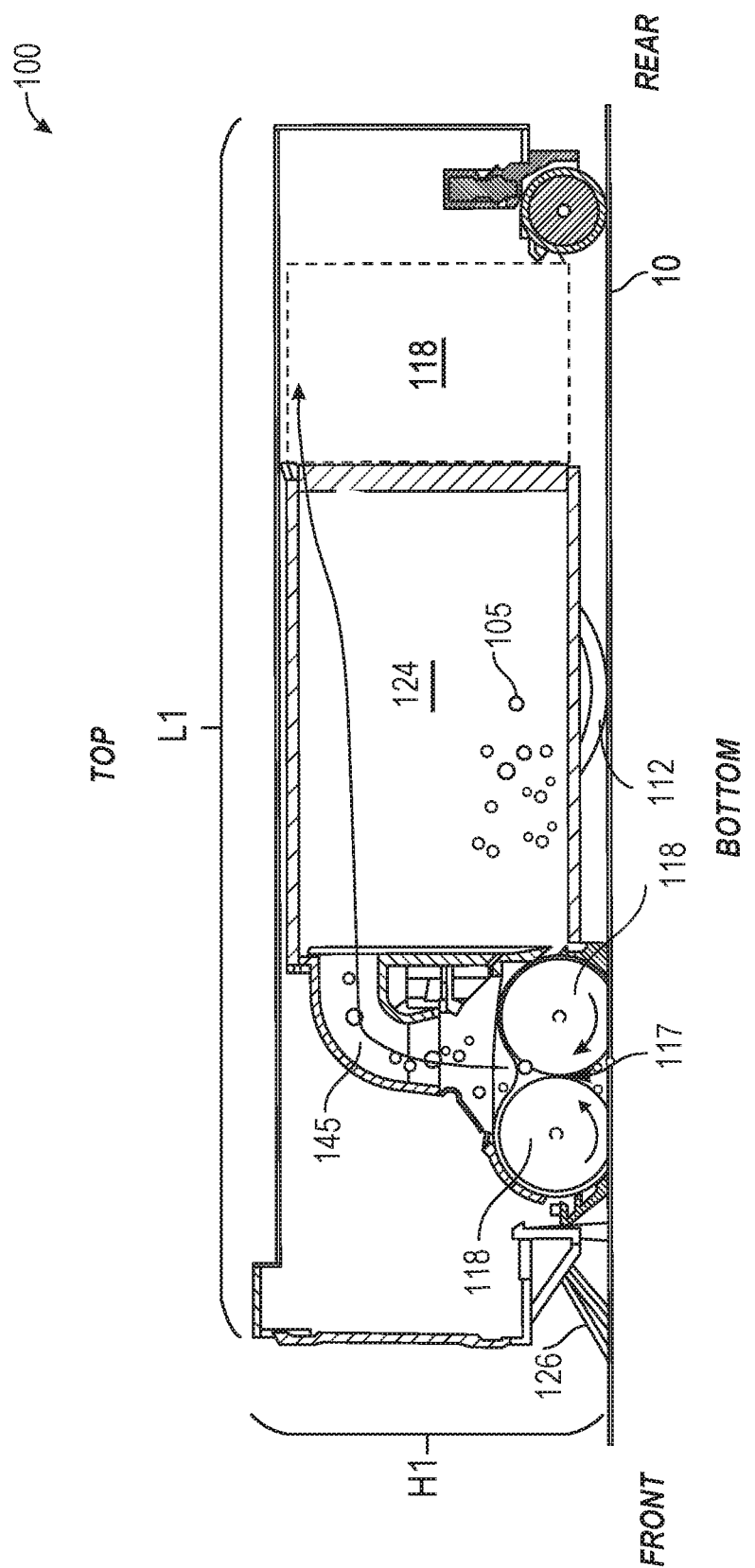
FIGS. 1, 2A, and 2B are side cross-sectional, bottom, and top perspective views of a mobile robot.

The present document describes systems, devices, and methods for controlling a mobile cleaning robot to escape from a detected stuck state using a using a learned robot escape behavior model. The escape behavior model establishes a relationship between sensor data associated with one or more stuck states and respective escape policies each including an instruction to the drive system or one or more actuators to get the mobile cleaning robot away from a corresponding stuck state. Reinforcement learning is used to train the model at a cloud-computing device or networked devices. According to one example, a mobile cleaning robot comprises a drive system, a sensor circuit to collect sensor data associated with a detected stuck state, and a controller circuit that can receive the trained robot escape behavior model, and apply the sensor data associated with the detected stuck state to the trained robot escape behavior model to determine an escape policy. The drive system, and/or one or more actuators of the mobile robot such as a wheel motor, a side brush motor, or a vacuum brush or roller motor, can remove the mobile robot from the stuck state according to the determined escape policy.

Conventionally, robot escape behaviors are a set of pre-determined universal rules irrespective of mobile robot types or models, robot operating conditions, or environments in which stuck-and-escape events may occur. The pre-determined escape policies are typically generated empirically, and/or are hard-coded such that the escape policies do not change over time. In the event of a stuck, one of the pre-determined rules may be selected, such as randomly, and applied to resolve the stuck. However, mobile cleaning robots of different types or models may have distinct object sensing capabilities and/or maneuvering (e.g., stuck-escaping) capabilities. On the other hand, for mobile cleaning robots of the same type or model, their capabilities of detecting various stuck states and escaping therefrom may vary such as due to robot age of operation, wear of various parts, or past stuck and escape experiences. Moreover, mobile robots that operate in different environments are likely to encounter different amount or types of stuck events, and thus may have different stuck-escaping experiences. Objects and their spatial contexts (e.g., relative locations) can affect incident rate and nature of stuck states. For example, a particular cleaning environment may include objects (e.g., furniture, or obstacles) with their respective spatial contexts. A mobile cleaning robot may more likely be in one stuck state than another stuck state when interacting with such objects.

For at least those reasons set forth above, universal rule-based escape policies may not provide satisfactory escape performances or comparable efficiencies across mobile cleaning robots of different types or models, or those of the same type or model but different operating conditions or environments. Additionally, since the universal rule-based escape policies are typically hardcoded into mobile cleaning robots, it can be difficult to make the policies customizable to be adapted to mobile cleaning robots of different types, models, or use experiences, or to be adapted to different cleaning environments.

The present document provides a technical solution to the unmet need of more efficient an consistent escape behaviors. A robot escape behavior model may be trained at a cloud-computing device or networked devices, which can provide cloud-based services of training, validating, and updating the robot behavior model. The trained robot escape behavior model can be accessible by a mobile robot, and can be customized according to robot types or models, robot operating conditions, or the robot cleaning environments. The robot escape behavior model, such as a neural network model, can be trained using a reinforcement learning methodology to establish a relationship between robot data, such as sensor data, associated with different stuck states and respective escape policies. Reinforcement learning (RL) is a machine learning approach for creating behavior policies under certain states in an environment in order to maximize cumulative rewards associated with the behavior policies. In contrast to supervised learning, RL does not require labelled input/output pairs (e.g., output of escape behaviors such as driving parameters corresponding to input of sensor data associated with stuck states) be presented to train the model, nor does it need sub-optimal actions to be explicitly corrected. Instead, RL maintains a balance between exploration of uncharted territory and exploitation of current knowledge during the model training process. For example, RL allows the model being trained to actively gather experience in situations where it performs poorly without needing external interventions (e.g., directions from human developers), and can directly optimize for escape behavior performance through the reward function.

Using RL to develop a robot escape behavior model may advantageously reduce model development time and human efforts of parameter tuning. For example, the same methodology for training the escape behaviors on one mobile robot may be used to train escape behaviors on another mobile robot. Knowledge about a stuck state and the corresponding escape behavior learned from one task can be transferred to the learning of another task. The RL-based escape behavior model and customization of said model for a specific robot type/model or a particular robot operating condition and/or environment, according to various examples discussed in this document, can lead to more robust robot behaviors and improve escape performances, including a higher success rate and more efficient escape behaviors (e.g., less time taken or power consumed) under different stuck states. With improved escape performances, chances of mission failure or abortion can be reduced, and mission completion rate can be increased.

The robots and techniques described herein, or portions thereof, can be controlled by a computer program product that includes instructions that are stored on one or more non-transitory machine-readable storage media, and that are executable on one or more processing devices to control (e.g., to coordinate) the operations described herein. The robots described herein, or portions thereof, can be implemented as all or part of an apparatus or electronic system that can include one or more processing devices and memory to store executable instructions to implement various operations.

In the following, mobile robot and its working environment are briefly discussed with reference to FIGS. 1-4. Detailed descriptions of systems, devices, mobile applications, and methods of training and validating a robot escape behavior model, and applying such a trained model to resolve a stuck state and move a mobile cleaning robot away therefrom, such as in accordance with various embodiments described herein, are discussed with reference to FIGS. 5 to 10.

Examples of Autonomous Mobile Robots

Figure 2A:
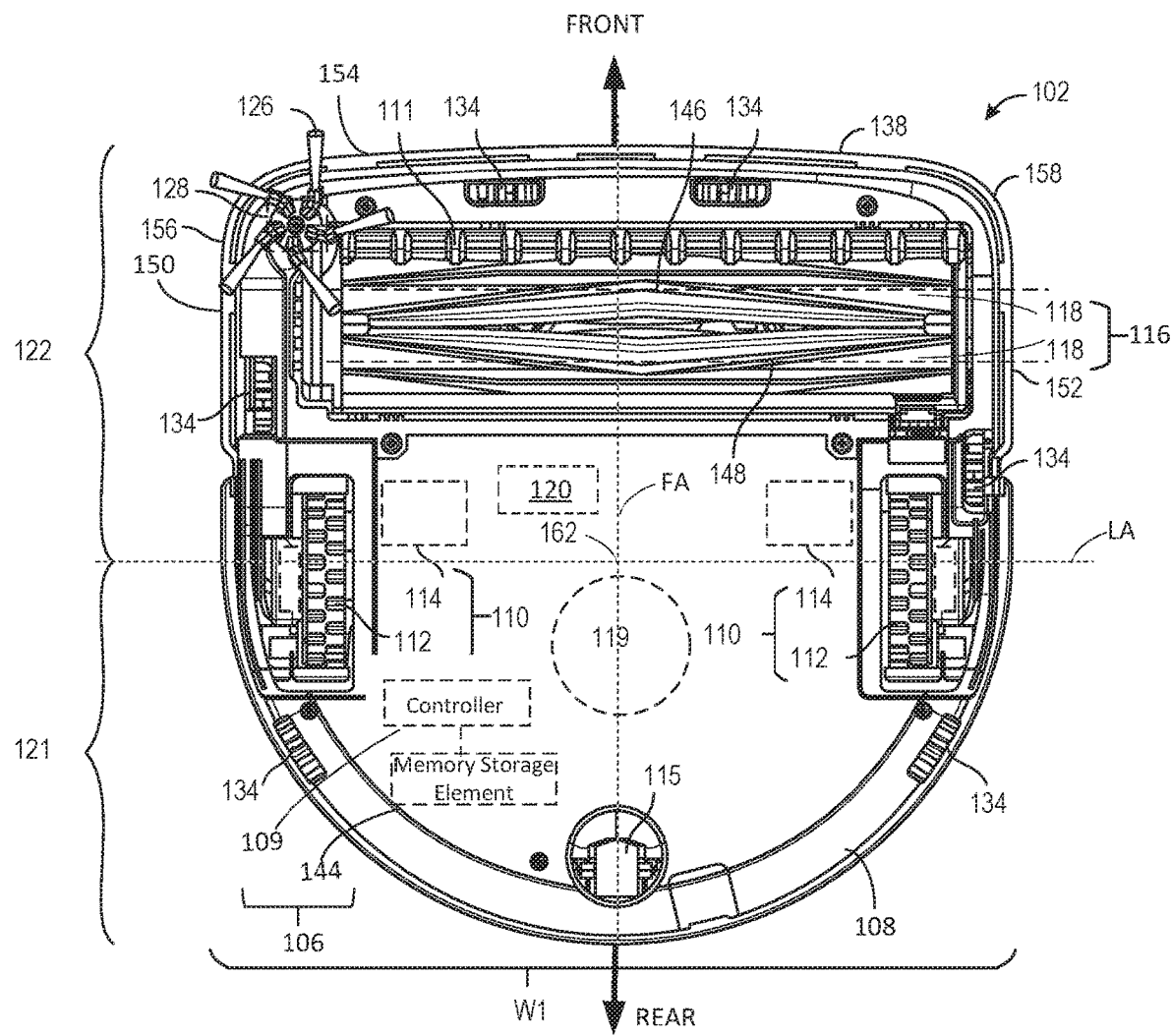
Figure 2B:
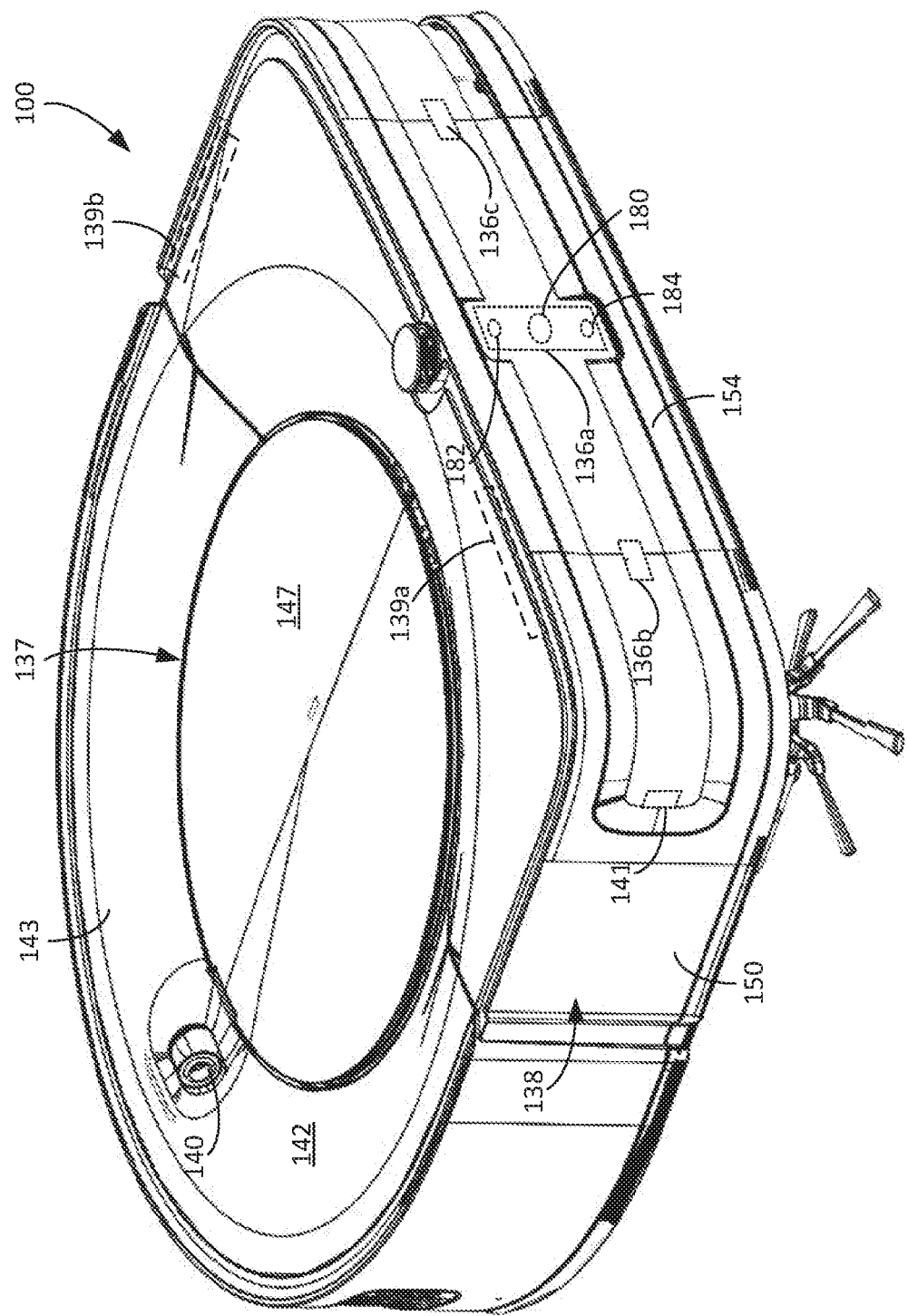

FIGS. 1 and 2A-2B depict different views of an example of a mobile robot 100. Referring to FIG. 1, the mobile robot 100 collects debris 105 from the floor surface 10 as the mobile robot 100 traverses the floor surface 10. Referring to FIG. 2A, the mobile robot 100 includes a robot housing infrastructure 108. The housing infrastructure 108 can define the structural periphery of the mobile robot 100. In some examples, the housing infrastructure 108 includes a chassis, cover, bottom plate, and bumper assembly. The mobile robot 100 is a household robot that has a small profile so that the mobile robot 100 can fit under furniture within a home. For example, a height H1 (shown in FIG. 1) of the mobile robot 100 relative to the floor surface is, for example, no more than 13 centimeters. The mobile robot 100 is also compact. An overall length L1 (shown in FIG. 1) of the mobile robot 100 and an overall width W1 (shown in FIG. 2A) are each between 30 and 60 centimeters, e.g., between 30 and 40 centimeters, 40 and 50 centimeters, or 50 and 60 centimeters. The overall width W1 can correspond to a width of the housing infrastructure 108 of the mobile robot 100.

The mobile robot 100 includes a drive system 110 including one or more drive wheels. The drive system 110 further includes one or more electric motors including electrically driven portions forming part of the electrical circuitry 106. The housing infrastructure 108 supports the electrical circuitry 106, including at least a controller circuit 109, within the mobile robot 100.

The drive system 110 is operable to propel the mobile robot 100 across the floor surface 10. The mobile robot 100 can be propelled in a forward drive direction F or a rearward drive direction R. The mobile robot 100 can also be propelled such that the mobile robot 100 turns in place or turns while moving in the forward drive direction F or the rearward drive direction R. In the example depicted in FIG. 2A, the mobile robot 100 includes drive wheels 112 extending through a bottom portion 113 of the housing infrastructure 108. The drive wheels 112 are rotated by motors 114 to cause movement of the mobile robot 100 along the floor surface 10. The mobile robot 100 further includes a passive caster wheel 115 extending through the bottom portion 113 of the housing infrastructure 108. The caster wheel 115 is not powered. Together, the drive wheels 112 and the caster wheel 115 cooperate to support the housing infrastructure 108 above the floor surface 10. For example, the caster wheel 115 is disposed along a rearward portion 121 of the housing infrastructure 108, and the drive wheels 112 are disposed forward of the caster wheel 115.

Referring to FIG. 2B, the mobile robot 100 includes a forward portion 122 that is substantially rectangular and a rearward portion 121 that is substantially semicircular. The forward portion 122 includes side surfaces 150, 152, a forward surface 154, and corner surfaces 156, 158. The corner surfaces 156, 158 of the forward portions 122 connect the side surface 150, 152 to the forward surface 154.

In the example depicted in FIGS. 1 and 2A-2B, the mobile robot 100 is an autonomous mobile floor cleaning robot that includes a cleaning head assembly 116 (shown in FIG. 2A) operable to clean the floor surface 10. For example, the mobile robot 100 is a vacuum cleaning robot in which the cleaning head assembly 116 is operable to clean the floor surface 10 by ingesting debris 105 (shown in FIG. 1) from the floor surface 10. The cleaning head assembly 116 includes a cleaning inlet 117 through which debris is collected by the mobile robot 100. The cleaning inlet 117 is positioned forward of a center of the mobile robot 100, e.g., a center 162, and along the forward portion 122 of the mobile robot 100 between the side surfaces 150, 152 of the forward portion 122.

The cleaning head assembly 116 includes one or more rotatable members, e.g., rotatable members 118 driven by a roller motor 120. The rotatable members 118 extend horizontally across the forward portion 122 of the mobile robot 100. The rotatable members 118 are positioned along a forward portion 122 of the housing infrastructure 108, and extend along 75% to 95% of a width of the forward portion 122 of the housing infrastructure 108, e.g., corresponding to an overall width W1 of the mobile robot 100. Referring also to FIG. 1, the cleaning inlet 117 is positioned between the rotatable members 118.

As shown in FIG. 1, the rotatable members 118 are rollers that counter rotate relative to one another. For example, the rotatable members 118 can include a front roller and a rear roller mounted parallel to the floor surface and spaced apart from one another by a small elongated gap. The rotatable members 118 can be rotatable about parallel horizontal axes 146, 148 (shown in FIG. 2A) to agitate debris 105 on the floor surface 10 and direct the debris 105 toward the cleaning inlet 117, into the cleaning inlet 117, and into a suction pathway 145 (shown in FIG. 1) in the mobile robot 100. Referring back to FIG. 2A, the rotatable members 118 can be positioned entirely within the forward portion 122 of the mobile robot 100. The rotatable members 118 include elastomeric shells that contact debris 105 on the floor surface 10 to direct debris 105 through the cleaning inlet 117 between the rotatable members 118 and into an interior of the mobile robot 100, e.g., into a debris bin 124 (shown in FIG. 1), as the rotatable members 118 rotate relative to the housing infrastructure 108. The rotatable members 118 further contact the floor surface 10 to agitate debris 105 on the floor surface 10. In the example as illustrated in FIG. 2A, the rotatable members 118, such as front and rear rollers, may each feature a pattern of chevron-shaped vanes distributed along its cylindrical exterior, and the vanes of at least one roller make contact with the floor surface along the length of the roller and experience a consistently applied friction force during rotation that is not present with brushes having pliable bristles.

The rotatable members 118 may take other suitable configurations. In an example, at least one of the front and rear rollers may include bristles and/or elongated pliable flaps for agitating the floor surface. In an example, a flapper brush, rotatably coupled to the cleaning head assembly housing, can include a compliant flap extending radially outward from the core to sweep a floor surface as the roller is driven to rotate. The flap is configured to prevent errant filaments from spooling tightly about the core to aid subsequent removal of the filaments. The flapper brush includes axial end guards mounted on the core adjacent the ends of the outer core surface and configured to prevent spooled filaments from traversing axially from the outer core surface onto the mounting features. The flapper brush can include multiple floor cleaning bristles extending radially outward from the core.

The mobile robot 100 further includes a vacuum system 119 operable to generate an airflow through the cleaning inlet 117 between the rotatable members 118 and into the debris bin 124. The vacuum system 119 includes an impeller and a motor to rotate the impeller to generate the airflow. The vacuum system 119 cooperates with the cleaning head assembly 116 to draw debris 105 from the floor surface 10 into the debris bin 124. In some cases, the airflow generated by the vacuum system 119 creates sufficient force to draw debris 105 on the floor surface 10 upward through the gap between the rotatable members 118 into the debris bin 124. In some cases, the rotatable members 118 contact the floor surface 10 to agitate the debris 105 on the floor surface 10, thereby allowing the debris 105 to be more easily ingested by the airflow generated by the vacuum system 119.

The mobile robot 100 further includes a brush 126 (also referred to as a side brush) that rotates about a non-horizontal axis, e.g., an axis forming an angle between 75 degrees and 90 degrees with the floor surface 10. The non-horizontal axis, for example, forms an angle between 75 degrees and 90 degrees with the longitudinal axes of the rotatable members 118. The mobile robot 100 includes a brush motor 128 operably connected to the side brush 126 to rotate the side brush 126.

The brush 126 is a side brush laterally offset from a fore-aft axis FA of the mobile robot 100 such that the brush 126 extends beyond an outer perimeter of the housing infrastructure 108 of the mobile robot 100. For example, the brush 126 can extend beyond one of the side surfaces 150, 152 of the mobile robot 100 and can thereby be capable of engaging debris on portions of the floor surface 10 that the rotatable members 118 typically cannot reach, e.g., portions of the floor surface 10 outside of a portion of the floor surface 10 directly underneath the mobile robot 100. The brush 126 is also forwardly offset from a lateral axis LA of the mobile robot 100 such that the brush 126 also extends beyond the forward surface 154 of the housing infrastructure 108. As depicted in FIG. 2A, the brush 126 extends beyond the side surface 150, the corner surface 156, and the forward surface 154 of the housing infrastructure 108. In some implementations, a horizontal distance D1 that the brush 126 extends beyond the side surface 150 is at least, for example, 0.2 centimeters, e.g., at least 0.25 centimeters, at least 0.3 centimeters, at least 0.4 centimeters, at least 0.5 centimeters, at least 1 centimeter, or more. The brush 126 is positioned to contact the floor surface 10 during its rotation so that the brush 126 can easily engage the debris 105 on the floor surface 10.

The brush 126 is rotatable about the non-horizontal axis in a manner that brushes debris on the floor surface 10 into a cleaning path of the cleaning head assembly 116 as the mobile robot 100 moves. For example, in examples in which the mobile robot 100 is moving in the forward drive direction F, the brush 126 is rotatable in a clockwise direction (when viewed from a perspective above the mobile robot 100) such that debris that the brush 126 contacts moves toward the cleaning head assembly and toward a portion of the floor surface 10 in front of the cleaning head assembly 116 in the forward drive direction F. As a result, as the mobile robot 100 moves in the forward drive direction F, the cleaning inlet 117 of the mobile robot 100 can collect the debris swept by the brush 126. In examples in which the mobile robot 100 is moving in the rearward drive direction R, the brush 126 is rotatable in a counterclockwise direction (when viewed from a perspective above the mobile robot 100) such that debris that the brush 126 contacts moves toward a portion of the floor surface 10 behind the cleaning head assembly 116 in the rearward drive direction R. As a result, as the mobile robot 100 moves in the rearward drive direction R, the cleaning inlet 117 of the mobile robot 100 can collect the debris swept by the brush 126.

The electrical circuitry 106 includes, in addition to the controller circuit 109, a memory storage element 144 and a sensor system with one or more electrical sensors, for example. The sensor system, as described herein, can generate a signal indicative of a current location of the mobile robot 100, and can generate signals indicative of locations of the mobile robot 100 as the mobile robot 100 travels along the floor surface 10. The controller circuit 109 is configured to execute instructions to perform one or more operations as described herein. The memory storage element 144 is accessible by the controller circuit 109 and disposed within the housing infrastructure 108. The one or more electrical sensors are configured to detect features in an environment of the mobile robot 100. For example, referring to FIG. 2A, the sensor system includes cliff sensors 134 disposed along the bottom portion 113 of the housing infrastructure 108. Each of the cliff sensors 134 is an optical sensor that can detect the presence or the absence of an object below the optical sensor, such as the floor surface 10. The cliff sensors 134 can thus detect obstacles such as drop-offs and cliffs below portions of the mobile robot 100 where the cliff sensors 134 are disposed and redirect the robot accordingly. More details of the sensor system and the controller circuit 109 are discussed below, such as with reference to FIG. 3.

Referring to FIG. 2B, the sensor system includes one or more proximity sensors that can detect objects along the floor surface 10 that are near the mobile robot 100. For example, the sensor system can include proximity sensors 136a, 136b, 136c disposed proximate the forward surface 154 of the housing infrastructure 108. Each of the proximity sensors 136a, 136b, 136c includes an optical sensor facing outward from the forward surface 154 of the housing infrastructure 108 and that can detect the presence or the absence of an object in front of the optical sensor. For example, the detectable objects include obstacles such as furniture, walls, persons, and other objects in the environment of the mobile robot 100.

The sensor system includes a bumper system including the bumper 138 and one or more bump sensors that detect contact between the bumper 138 and obstacles in the environment. The bumper 138 forms part of the housing infrastructure 108. For example, the bumper 138 can form the side surfaces 150, 152 as well as the forward surface 154. The sensor system, for example, can include the bump sensors 139a, 139b. The bump sensors 139a, 139b can include break beam sensors, capacitive sensors, or other sensors that can detect contact between the mobile robot 100, e.g., the bumper 138, and objects in the environment. In some implementations, the bump sensor 139a can be used to detect movement of the bumper 138 along the fore-aft axis FA (shown in FIG. 2A) of the mobile robot 100, and the bump sensor 139b can be used to detect movement of the bumper 138 along the lateral axis LA (shown in FIG. 2A) of the mobile robot 100. The proximity sensors 136a, 136b, 136c can detect objects before the mobile robot 100 contacts the objects, and the bump sensors 139a, 139b can detect objects that contact the bumper 138, e.g., in response to the mobile robot 100 contacting the objects.

The sensor system includes one or more obstacle following sensors. For example, the mobile robot 100 can include an obstacle following sensor 141 along the side surface 150. The obstacle following sensor 141 includes an optical sensor facing outward from the side surface 150 of the housing infrastructure 108 and that can detect the presence or the absence of an object adjacent to the side surface 150 of the housing infrastructure 108. The obstacle following sensor 141 can emit an optical beam horizontally in a direction perpendicular to the forward drive direction F of the mobile robot 100 and perpendicular to the side surface 150 of the mobile robot 100. For example, the detectable objects include obstacles such as furniture, walls, persons, and other objects in the environment of the mobile robot 100. In some implementations, the sensor system can include an obstacle following sensor along the side surface 152, and the obstacle following sensor can detect the presence or the absence an object adjacent to the side surface 152. The obstacle following sensor 141 along the side surface 150 is a right obstacle following sensor, and the obstacle following sensor along the side surface 152 is a left obstacle following sensor. The one or more obstacle following sensors, including the obstacle following sensor 141, can also serve as obstacle detection sensors, e.g., similar to the proximity sensors described herein. In this regard, the left obstacle following can be used to determine a distance between an object, e.g., an obstacle surface, to the left of the mobile robot 100 and the mobile robot 100, and the right obstacle following sensor can be used to determine a distance between an object, e.g., an obstacle surface, to the right of the mobile robot 100 and the mobile robot 100.

In some implementations, at least some of the proximity sensors 136a, 136b, 136c, and the obstacle following sensor 141 each includes an optical emitter and an optical detector. The optical emitter emits an optical beam outward from the mobile robot 100, e.g., outward in a horizontal direction, and the optical detector detects a reflection of the optical beam that reflects off an object near the mobile robot 100. The mobile robot 100, e.g., using the controller circuit 109, can determine a time of flight of the optical beam and thereby determine a distance between the optical detector and the object, and hence a distance between the mobile robot 100 and the object.

In some implementations, the proximity sensor 136a includes an optical detector 180 and multiple optical emitters 182, 184. One of the optical emitters 182, 184 can be positioned to direct an optical beam outwardly and downwardly, and the other of the optical emitters 182, 184 can be positioned to direct an optical beam outwardly and upwardly. The optical detector 180 can detect reflections of the optical beams or scatter from the optical beams. In some implementations, the optical detector 180 is an imaging sensor, a camera, or some other type of detection device for sensing optical signals. In some implementations, the optical beams illuminate horizontal lines along a planar vertical surface forward of the mobile robot 100. In some implementations, the optical emitters 182, 184 each emit a fan of beams outward toward an obstacle surface such that a one-dimensional grid of dots appear on one or more obstacle surfaces. The one-dimensional grid of dots can be positioned on a horizontally extending line. In some implementations, the grid of dots can extend across multiple obstacle surfaces, e.g., multiple obstacle surfaces adjacent to one another. The optical detector 180 can capture an image representative of the grid of dots formed by the optical emitter 182 and the grid of dots formed by the optical emitter 184. Based on a size of a dot in the image, the mobile robot 100 can determine a distance of an object on which the dot appears relative to the optical detector 180, e.g., relative to the mobile robot 100. The mobile robot 100 can make this determination for each of the dots, thus allowing the mobile robot 100 to determine a shape of an object on which the dots appear. In addition, if multiple objects are ahead of the mobile robot 100, the mobile robot 100 can determine a shape of each of the objects. In some implementations, the objects can include one or more objects that are laterally offset from a portion of the floor surface 10 directly in front of the mobile robot 100.

The sensor system further includes an image capture device 140, e.g., a camera, directed toward a top portion 142 of the housing infrastructure 108. The image capture device 140 generates digital imagery of the environment of the mobile robot 100 as the mobile robot 100 moves about the floor surface 10. The image capture device 140 is angled in an upward direction, e.g., angled between 30 degrees and 80 degrees from the floor surface 10 about which the mobile robot 100 navigates. The camera, when angled upward, is able to capture images of wall surfaces of the environment so that features corresponding to objects on the wall surfaces can be used for localization.

When the controller circuit 109 causes the mobile robot 100 to perform the mission, the controller circuit 109 operates the motors 114 to drive the drive wheels 112 and propel the mobile robot 100 along the floor surface 10. In addition, the controller circuit 109 operates the roller motor 120 to cause the rotatable members 118 to rotate, operates the brush motor 128 to cause the side brush 126 to rotate, and operates the motor of the vacuum system 119 to generate the airflow. To cause the mobile robot 100 to perform various navigational and cleaning behaviors, the controller circuit 109 executes software stored on the memory storage element 144 to cause the mobile robot 100 to perform by operating the various motors of the mobile robot 100. The controller circuit 109 operates the various motors of the mobile robot 100 to cause the mobile robot 100 to perform the behaviors.

The sensor system can further include sensors for tracking a distance travelled by the mobile robot 100. For example, the sensor system can include encoders associated with the motors 114 for the drive wheels 112, and these encoders can track a distance that the mobile robot 100 has travelled. In some implementations, the sensor system includes an optical sensor facing downward toward a floor surface. The optical sensor can be an optical mouse sensor. For example, the optical sensor can be positioned to direct light through a bottom surface of the mobile robot 100 toward the floor surface 10. The optical sensor can detect reflections of the light and can detect a distance travelled by the mobile robot 100 based on changes in floor features as the mobile robot 100 travels along the floor surface 10.

The controller circuit 109 uses data collected by the sensors of the sensor system to control navigational behaviors of the mobile robot 100 during the mission. For example, the controller circuit 109 uses the sensor data collected by obstacle detection sensors of the mobile robot 100, e.g., the cliff sensors 134, the proximity sensors 136a, 136b, 136c, and the bump sensors 139a, 139b, to enable the mobile robot 100 to avoid obstacles or to prevent from falling downstairs within the environment of the mobile robot 100 during the mission. In some examples, the controller circuit 109 controls the navigational behavior of the mobile robot 100 using information about the environment, such as a map of the environment. With proper navigation, the mobile robot 100 is able to reach a goal position or completes a coverage mission as efficiently and as reliably as possible.

The sensor data can be used by the controller circuit 109 for simultaneous localization and mapping (SLAM) techniques in which the controller circuit 109 extracts features of the environment represented by the sensor data and constructs a map of the floor surface 10 of the environment. The sensor data collected by the image capture device 140 can be used for techniques such as vision-based SLAM (SLAM) in which the controller circuit 109 extracts visual features corresponding to objects in the environment and constructs the map using these visual features. As the controller circuit 109 directs the mobile robot 100 about the floor surface 10 during the mission, the controller circuit 109 uses SLAM techniques to determine a location of the mobile robot 100 within the map by detecting features represented in collected sensor data and comparing the features to previously stored features. The map formed from the sensor data can indicate locations of traversable and nontraversable space within the environment. For example, locations of obstacles are indicated on the map as nontraversable space, and locations of open floor space are indicated on the map as traversable space.

The sensor data collected by any of the sensors can be stored in the memory storage element 144. In addition, other data generated for the SLAM techniques, including mapping data forming the map, can be stored in the memory storage element 144. These data produced during the mission can include persistent data that are produced during the mission and that are usable during a further mission. For example, the mission can be a first mission, and the further mission can be a second mission occurring after the first mission. In addition to storing the software for causing the mobile robot 100 to perform its behaviors, the memory storage element 144 stores sensor data or data resulting from processing of the sensor data for access by the controller circuit 109 from one mission to another mission. For example, the map can be a persistent map that is usable and updateable by the controller circuit 109 of the mobile robot 100 from one mission to another mission to navigate the mobile robot 100 about the floor surface 10. According to various embodiments discussed in this document, the persistent map can be updated in response to instruction commands received from a user. The controller circuit 109 can modify subsequent or future navigational behaviors of the mobile robot 100 according to the updated persistent map, such as by modifying the planned path or updating obstacle avoidance strategy.

The persistent data, including the persistent map, enables the mobile robot 100 to efficiently clean the floor surface 10. For example, the persistent map enables the controller circuit 109 to direct the mobile robot 100 toward open floor space and to avoid nontraversable space. In addition, for subsequent missions, the controller circuit 109 is able to plan navigation of the mobile robot 100 through the environment using the persistent map to optimize paths taken during the missions.

The mobile robot 100 can, in some implementations, include a light indicator system 137 located on the top portion 142 of the mobile robot 100. The light indicator system 137 can include light sources positioned within a lid 147 covering the debris bin 124 (shown in FIG. 2A). The light sources can be positioned to direct light to a periphery of the lid 147. The light sources are positioned such that any portion of a continuous loop 143 on the top portion 142 of the mobile robot 100 can be illuminated. The continuous loop 143 is located on a recessed portion of the top portion 142 of the mobile robot 100 such that the light sources can illuminate a surface of the mobile robot 100 as they are activated.

Figure 3:
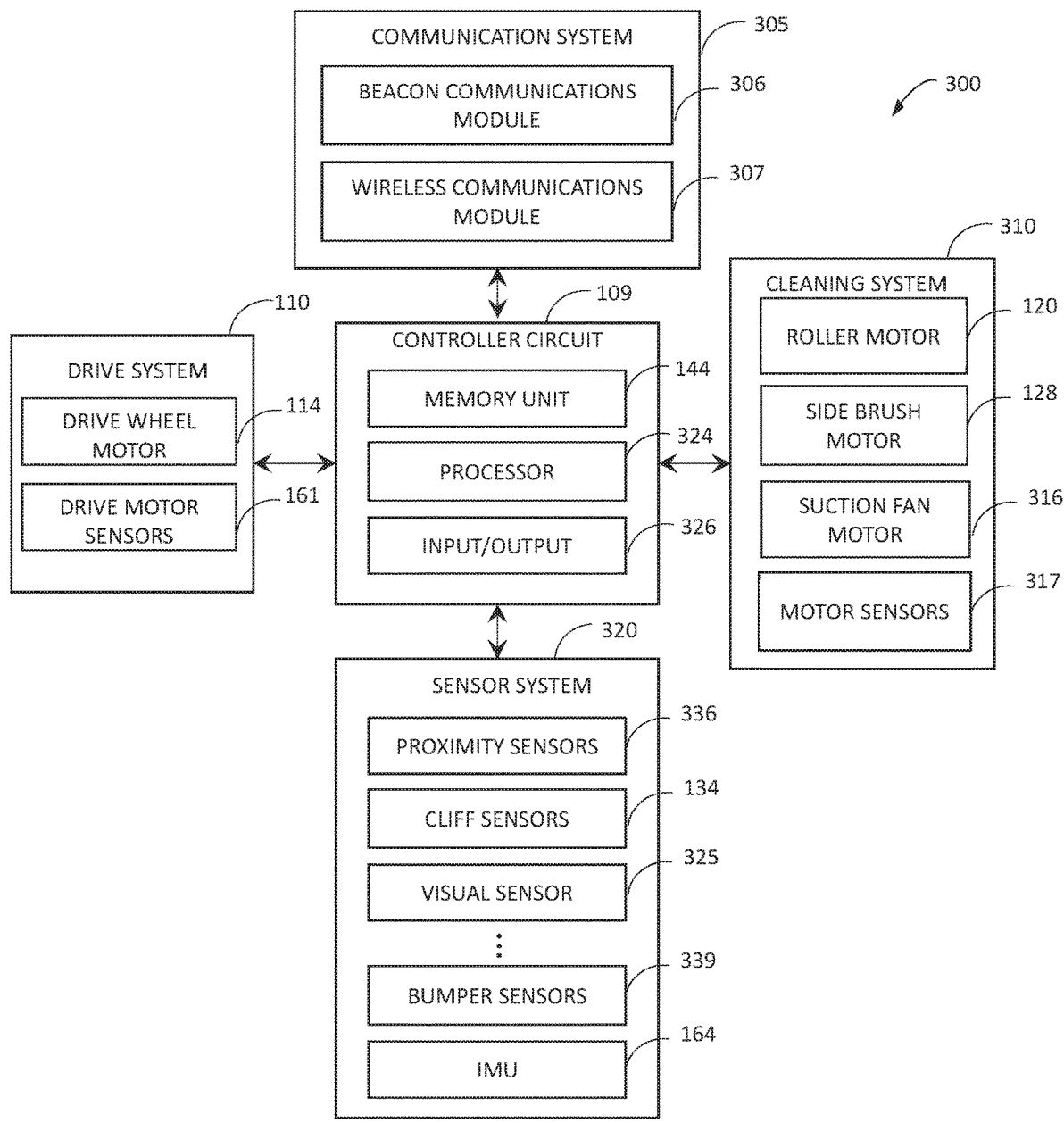
FIG. 3 is a diagram illustrating an example of a control architecture for operating a mobile cleaning robot.

FIG. 3 is a diagram illustrating an example of a control architecture 300 for operating a mobile cleaning robot. The controller circuit 109 can be communicatively coupled to various subsystems of the mobile robot 100, including a communications system 305, a cleaning system 310, a drive system 110, and a sensor system 320. The controller circuit 109 includes a memory storage element 144 that holds data and instructions for processing by a processor 324. The processor 324 receives program instructions and feedback data from the memory storage element 144, executes logical operations called for by the program instructions, and generates command signals for operating the respective subsystem components of the mobile robot 100. An input/output unit 326 transmits the command signals and receives feedback from the various illustrated components.

The communications system 305 can include a beacon communications module 306 and a wireless communications module 307. The beacon communications module 306 may be communicatively coupled to the controller circuit 109. In some embodiments, the beacon communications module 306 is operable to send and receive signals to and from a remote device. For example, the beacon communications module 306 may detect a navigation signal projected from an emitter of a navigation or virtual wall beacon or a homing signal projected from the emitter of a docking station. Docking, confinement, home base, and homing technologies are discussed in U.S. Pat. Nos. 7,196,487 and 7,404,000, U.S. Patent Application Publication No. 20050156562, and U.S. Patent Application Publication No. 20140100693 (the entireties of which are hereby incorporated by reference). As described in U.S. Patent Publication 2014/0207282 (the entirety of which is hereby incorporated by reference), the wireless communications module 307 facilitates the communication of information describing a status of the mobile robot 100 over a suitable wireless network (e.g., a wireless local area network) with one or more mobile devices (e.g., mobile device 404 shown in FIG. 4A). More details of the communications system 305 are discussed below, such as with reference to FIG. 4A.

The cleaning system 310 can include the roller motor 120, a brush motor 128 driving the side brush 126, and a suction fan motor 316 powering the vacuum system 119. The cleaning system 310 further includes multiple motor sensors 317 that monitor operation of the roller motor 120, the brush motor 128, and the suction fan motor 316 to facilitate closed-loop control of the motors by the controller circuit 109. In some embodiments, the roller motor 120 is operated by the controller circuit 109 (or a suitable microcontroller) to drive the rollers (e.g., rotatable members 118) according to a particular speed setting via a closed-loop pulse-width modulation (PWM) technique, where the feedback signal is received from a motor sensor 317 monitoring a signal indicative of the rotational speed of the roller motor 120. For example, such a motor sensor 317 may be provided in the form of a motor current sensor (e.g., a shunt resistor, a current-sensing transformer, and/or a Hall Effect current sensor).

The drive system 110 can include a drive-wheel motor 114 for operating the drive wheels 112 in response to drive commands or control signals from the controller circuit 109, as well as multiple drive motor sensors 161 to facilitate closed-loop control of the drive wheels (e.g., via a suitable PWM technique as described above). In some implementations, a microcontroller assigned to the drive system 110 is configured to decipher drive commands having x, y, and θ components. The controller circuit 109 may issue individual control signals to the drive-wheel motor 114. In any event, the controller circuit 109 can maneuver the mobile robot 100 in any direction across a cleaning surface by independently controlling the rotational speed and direction of each drive wheel 112 via the drive-wheel motor 114.

The controller circuit 109 can operate the drive system 110 in response to signals received from the sensor system 320. For example, the controller circuit 109 may operate the drive system 110 to redirect the mobile robot 100 to avoid obstacles and clutter encountered while treating a floor surface. In another example, if the mobile robot 100 becomes stuck or entangled during use, the controller circuit 109 may operate the drive system 110 according to one or more escape behaviors. To achieve reliable autonomous movement, the sensor system 320 may include several different types of sensors that can be used in combination with one another to allow the mobile robot 100 to make intelligent decisions about a particular environment. By way of example and not limitation, the sensor system 320 can include one or more of proximity sensors 336 (such as the proximity sensors 136a-136c), the cliff sensors 134, a visual sensor 325 such as the image capture device 140 configured for detecting features and landmarks in the operating environment and building a virtual map, such as using VSLAM technology, as described above.

The sensor system 320 may further include bumper sensors 339 (such as the bumper sensors 139a and 139b), responsive to activation of the bumper 138. The sensor system 320 can include an inertial measurement unit (IMU) 164 that is, in part, responsive to changes in position of the mobile robot 100 with respect to a vertical axis substantially perpendicular to the floor and senses when the mobile robot 100 is pitched at a floor type interface having a difference in height, which is potentially attributable to a flooring type change. In some examples, the IMU 164 is a six-axis IMU having a gyro sensor that measures the angular velocity of the mobile robot 100 relative to the vertical axis. However, other suitable configurations are also contemplated. For example, the IMU 164 may include an accelerometer sensitive to the linear acceleration of the mobile robot 100 along the vertical axis. In any event, output from the IMU 164 is received by the controller circuit 109 and processed to detect a discontinuity in the floor surface across which the mobile robot 100 is traveling. Within the context of the present disclosure the terms "flooring discontinuity" and "threshold" refer to any irregularity in the floor surface (e.g., a change in flooring type or change in elevation at a flooring interface) that is traversable by the mobile robot 100, but that causes a discrete vertical movement event (e.g., an upward or downward "bump"). The vertical movement event could refer to a part of the drive system (e.g., one of the drive wheels 112) or the chassis of the robot housing infrastructure 108, depending on the configuration and placement of the IMU 164. Detection of a flooring threshold, or flooring interface, may prompt the controller circuit 109 to expect a change in floor type. For example, the mobile robot 100 may experience a significant downward vertical bump as it moves from high pile carpet (a soft floor surface) to a tile floor (a hard floor surface), and an upward bump in the opposite case.

A wide variety of other types of sensors, though not shown or described in connection with the illustrated examples, may be incorporated in the sensor system 320 (or any other subsystem) without departing from the scope of the present disclosure. Such sensors may function as obstacle detection units, obstacle detection obstacle avoidance (ODOA) sensors, wheel drop sensors, obstacle-following sensors, stall-sensor units, drive-wheel encoder units, bumper sensors, accelerometers, and the like.

Examples of Communication Networks

Figure 4A:
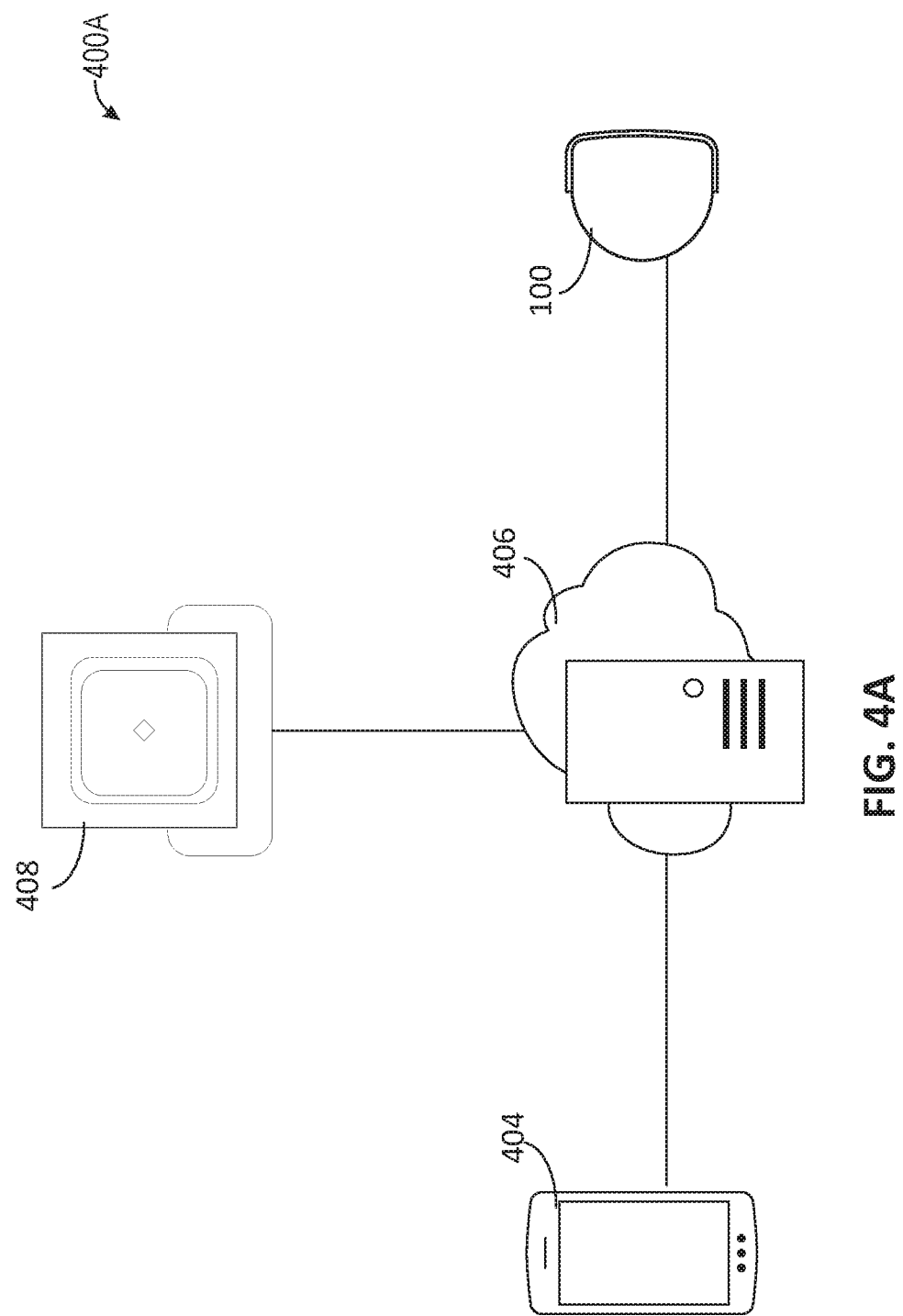
FIG. 4A is a diagram illustrating an example of a communication network in which a mobile cleaning robot operates and data transmission in the network.

FIG. 4A is a diagram illustrating by way of example and not limitation a communication network 400A that enables networking between the mobile robot 100 and one or more other devices, such as a mobile device 404, a cloud computing system 406, or another autonomous robot 408 separate from the mobile device 404. Using the communication network 400A, the mobile robot 100, the mobile device 404, the robot 408, and the cloud computing system 406 can communicate with one another to transmit data to one another and receive data from one another. In some implementations, the mobile robot 100, the robot 408, or both the mobile robot 100 and the robot 408 communicate with the mobile device 404 through the cloud computing system 406. Alternatively or additionally, the mobile robot 100, the robot 408, or both the mobile robot 100 and the robot 408 communicate directly with the mobile device 404. Various types and combinations of wireless networks (e.g., Bluetooth, radio frequency, optical based, etc.) and network architectures (e.g., mesh networks) may be employed by the communication network 400A.

In some implementations, the mobile device 404 as shown in FIG. 4A is a remote device that can be linked to the cloud computing system 406, and can enable a user to provide inputs on the mobile device 404. The mobile device 404 can include user input elements such as, for example, one or more of a touchscreen display, buttons, a microphone, a mouse, a keyboard, or other devices that respond to inputs provided by the user. The mobile device 404 alternatively or additionally includes immersive media (e.g., virtual reality) with which the user interacts to provide a user input. The mobile device 404, in these cases, is, for example, a virtual reality headset or a head-mounted display. The user can provide inputs corresponding to commands for the mobile device 404. In such cases, the mobile device 404 transmits a signal to the cloud computing system 406 to cause the cloud computing system 406 to transmit a command signal to the mobile robot 100. In some implementations, the mobile device 404 can present augmented reality images. In some implementations, the mobile device 404 is a smart phone, a laptop computer, a tablet computing device, or other mobile device.

According to various embodiments discussed herein, the mobile device 404 may include a user interface configured to display a map of the robot environment. Robot path, such as that identified by the coverage planner of the controller circuit 109, may also be displayed on the map. The interface may receive a user instruction to modify the environment map, such as by adding, removing, or otherwise modifying a keep-out traversable zone in the environment; adding, removing, or otherwise modifying a duplicate traversal zone in the environment (such as an area that requires repeated cleaning); restricting a robot traversal direction or traversal pattern in a portion of the environment; or adding or changing a cleaning rank, among others.

In some implementations, the communication network 400A can include additional nodes. For example, nodes of the communication network 400A can include additional robots. Alternatively or additionally, nodes of the communication network 400A can include network-connected devices. In some implementations, a network-connected device can generate information about the environment 20. The network-connected device can include one or more sensors to detect features in the environment 20, such as an acoustic sensor, an image capture system, or other sensor generating signals from which features can be extracted. Network-connected devices can include home cameras, smart sensors, and the like.

In the communication network 400A depicted in FIG. 4A and in other implementations of the communication network 400A, the wireless links may utilize various communication schemes, protocols, etc., such as, for example, Bluetooth classes, Wi-Fi, Bluetooth-low-energy, also known as BLE, 802.15.4, Worldwide Interoperability for Microwave Access (WiMAX), an infrared channel or satellite band. In some cases, the wireless links include any cellular network standards used to communicate among mobile devices, including, but not limited to, standards that qualify as 1G, 2G, 3G, or 4G. The network standards, if utilized, qualify as, for example, one or more generations of mobile telecommunication standards by fulfilling a specification or standards such as the specifications maintained by International Telecommunication Union. The 3G standards, if utilized, correspond to, for example, the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA.

Figure 4B:
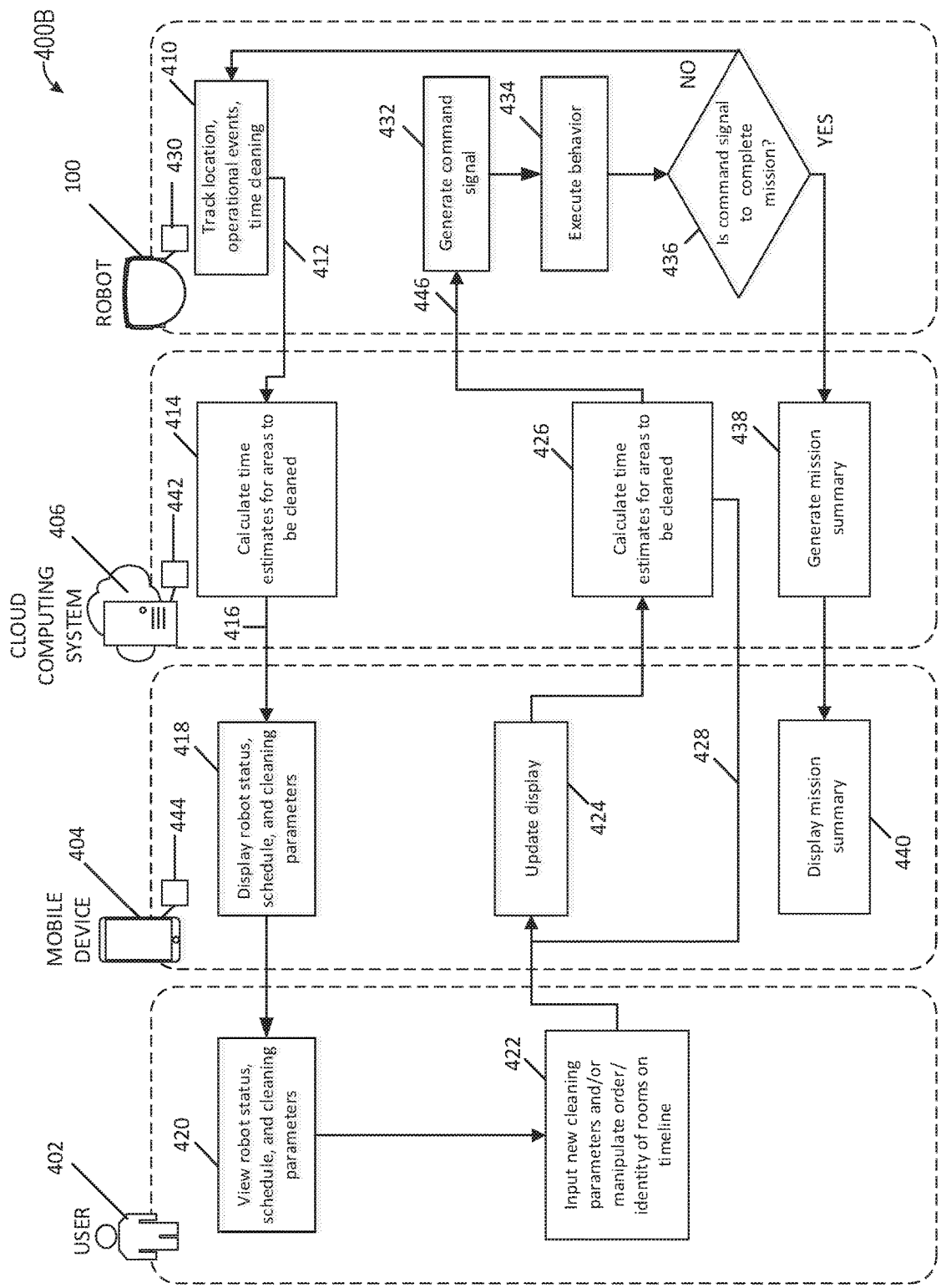
FIG. 4B is a diagram illustrating an exemplary process of exchanging information between the mobile robot and other devices in a communication network.

FIG. 4B is a diagram illustrating an exemplary process 400B of exchanging information among devices in the communication network 400A, including the mobile robot 100, the cloud computing system 406, and the mobile device 404. A cleaning mission may be initiated by pressing a button on the mobile robot 100 or may be scheduled for a future time or day. The user may select a set of rooms to be cleaned during the cleaning mission or may instruct the robot to clean all rooms. The user may also select a set of cleaning parameters to be used in each room during the cleaning mission.

During a cleaning mission, the mobile robot 100 tracks 410 its status, including its location, any operational events occurring during cleaning, and a time spent cleaning. The mobile robot 100 transmits 412 status data (e.g. one or more of location data, operational event data, time data) to a cloud computing system 406, which calculates 414, by a processor 442, time estimates for areas to be cleaned. For example, a time estimate could be calculated for a cleaning room by averaging the actual cleaning times for the room that have been gathered during multiple (e.g. two or more) prior cleaning missions for the room. The cloud computing system 406 transmits 416 time estimate data along with robot status data to a mobile device 404. The mobile device 404 presents 418, by a processor 444, the robot status data and time estimate data on a display. The robot status data and time estimate data may be presented on the display of the mobile device as any of a number of graphical representations editable mission timeline and/or a mapping interface. In some examples, the mobile robot 100 can communicate directly with the mobile device 404.

A user 402 views 420 the robot status data and time estimate data on the display and may input 422 new cleaning parameters or may manipulate the order or identity of rooms to be cleaned. The user 402, may, for example, delete rooms from a cleaning schedule of the mobile robot 100. In other instances, the user 402, may, for example, select an edge cleaning mode or a deep clean mode for a room to be cleaned. The display of the mobile device 404 is updates 424 as the user inputs changes to the cleaning parameters or cleaning schedule. For example, if the user changes the cleaning parameters from single pass cleaning to dual pass cleaning, the system will update the estimated time to provide an estimate based on the new parameters. In this example of single pass cleaning vs. dual pass cleaning, the estimate would be approximately doubled. In another example, if the user removes a room from the cleaning schedule, the total time estimate is decreased by approximately the time needed to clean the removed room. Based on the inputs from the user 402, the cloud computing system 406 calculates 426 time estimates for areas to be cleaned, which are then transmitted 428 (e.g. by a wireless transmission, by applying a protocol, by broadcasting a wireless transmission) back to the mobile device 404 and displayed. Additionally, data relating to the calculated 426 time estimates are transmitted 446 to a controller 430 of the robot. Based on the inputs from the user 402, which are received by the controller 430 of the mobile robot 100, the controller 430 generates 432 a command signal. The command signal commands the mobile robot 100 to execute 434 a behavior, which may be a cleaning behavior. As the cleaning behavior is executed, the controller continues to track 410 the robot's status, including its location, any operational events occurring during cleaning, and a time spent cleaning. In some instances, live updates relating to the robot's status may be additionally provided via push notifications to a mobile device or home electronic system (e.g. an interactive speaker system).

Upon executing 434 a behavior, the controller 430 checks 436 to see if the received command signal includes a command to complete the cleaning mission. If the command signal includes a command to complete the cleaning mission, the robot is commanded to return to its dock and upon return sends information to enable the cloud computing system 406 to generate 438 a mission summary which is transmitted to, and displayed 440 by, the mobile device 404. The mission summary may include a timeline and/or a map. The timeline may display, the rooms cleaned, a time spent cleaning each room, operational events tracked in each room, etc. The map may display the rooms cleaned, operational events tracked in each room, a type of cleaning (e.g. sweeping or mopping) performed in each room, etc.

Operations for the process 400B and other processes described herein can be executed in a distributed manner. For example, the cloud computing system 406, the mobile robot 100, and the mobile device 404 may execute one or more of the operations in concert with one another. Operations described as executed by one of the cloud computing system 406, the mobile robot 100, and the mobile device 404 are, in some implementations, executed at least in part by two or all of the cloud computing system 406, the mobile robot 100, and the mobile device 404.

Examples of Robot Escape Management System

Various embodiments of systems, devices, and processes of training and validating a robot escape behavior model, and using such a model by a mobile cleaning robot to escape a detected stuck state, are discussed in this document such as with reference to FIGS. 5-10. While this document makes reference to the mobile robot 100 that performs floor cleaning, the robot scheduling and controlling system and methods discussed herein can be used in robots designed for different applications, such as mopping, mowing, transporting, surveillance, among others. Additionally, while some components, modules, and operations may be described as being implemented in and performed by the mobile robot 100, by a user, by a computing device, or by another actor, these operations may, in some implementations, be performed by actors other than those described. For example, an operation performed by the mobile robot 100 can be, in some implementations, performed by the cloud computing system 406 or by another computing device (or devices). In other examples, an operation performed by the user can be performed by a computing device. In some implementations, the cloud computing system 406 does not perform any operations. Rather, other computing devices perform the operations described as being performed by the cloud computing system 406, and these computing devices can be in direct (or indirect) communication with one another and the mobile robot 100. In some implementations, the mobile robot 100 can perform, in addition to the operations described as being performed by the mobile robot 100, the operations described as being performed by the cloud computing system 406 or the mobile device 404. Other variations are possible. Furthermore, while the methods and processes described herein are described as including certain operations or sub-operations, in other implementations, one or more of these operation or sub-operations may be omitted, or additional operations or sub-operations may be added.

Figure 5:
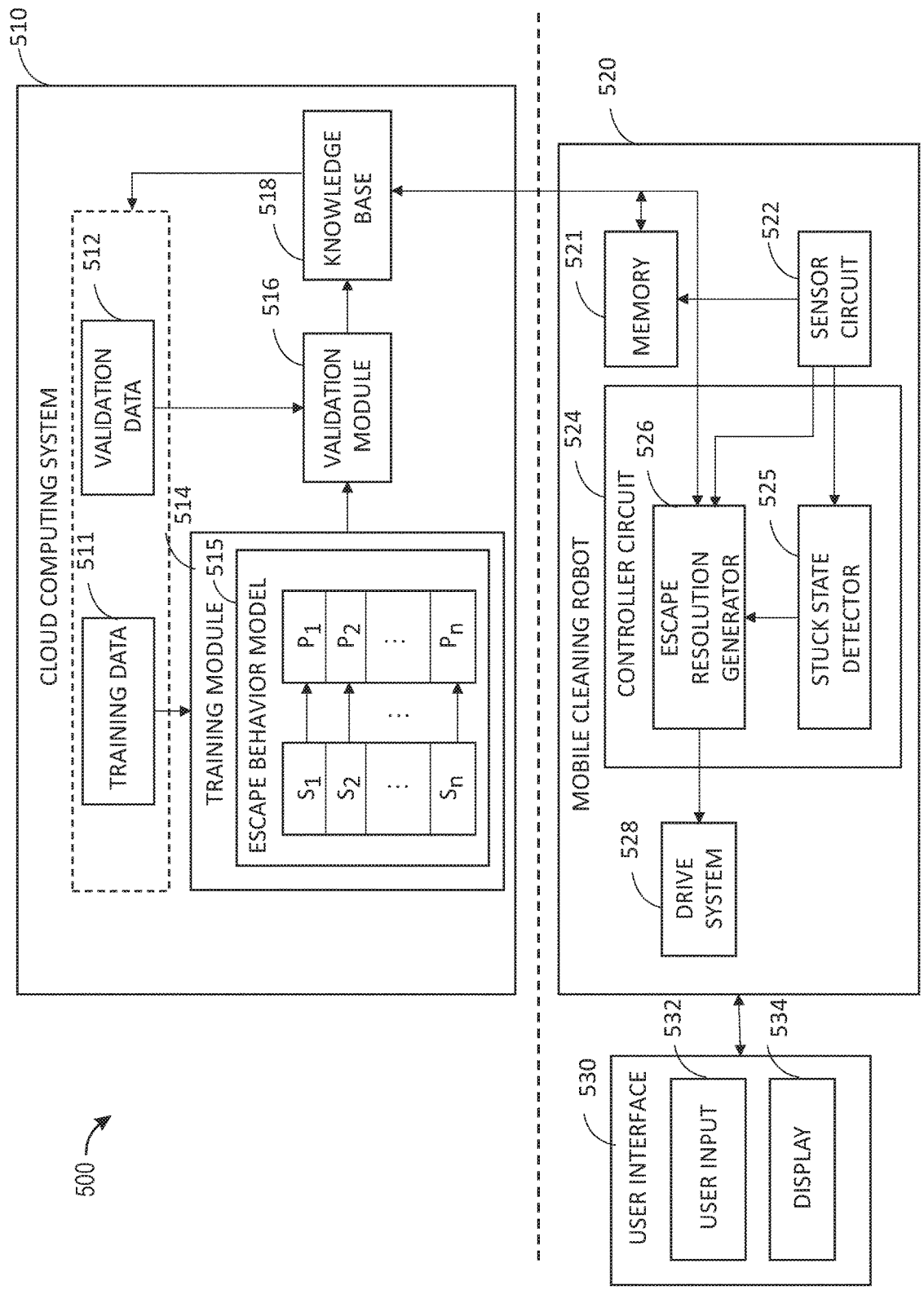
FIG. 5 is a block diagram illustrating an example of a robot escape management system 500 to generate a trained, customizable robot escape behavior model, and use such a model to manage behavior of a mobile cleaning robot to escape from a stuck state.

FIG. 5 is a diagram illustrating an example of a robot escape management system 500 that can generate a trained, customizable robot escape behavior model, and maneuver a mobile cleaning robot to escape from a stuck state using the trained escape behavior model. The robot escape management system 500, and methods of using the same, as described herein in accordance with various embodiments, may be used to control one or more mobile robots of various types, such as a mobile cleaning robot, a mobile mopping robot, a lawn mowing robot, or a space-monitoring robot, among others.

The system 500 may include a cloud computing system 510, a mobile cleaning robot 520, and a user interface 530. The cloud computing system 510, which can be an example of the cloud computing system 406 as shown in FIGS. 4A and 4B, may include a cloud-computing device or networked devices configured to provide a cloud-based service of training or updating a robot escape behavior model. As illustrated in FIG. 5, the cloud computing system 510 may include a training module 514 that can generate a trained robot escape behavior model 515. The robot escape behavior model 515 can be trained to establish a relationship, such as a mapping, between (1) one or more robot states, such as N states $\{S_1, S_2, \ldots, S_N\}$, and (2) respective escape policies, such as N corresponding escape policies $\{P_1, P_2, \ldots, P_N\}$. In an example, the robot escape behavior model 515 can be a neural network model. In another example, the robot escape behavior model 515 can be represented by a table, or one or more mathematical equations. A robot state input (e.g., $S_1$) can be represented by data collected from one or more sensors associated with a robot stuck state, such as one or more of the sensors in the sensor system 320 of a mobile robot, as illustrated in FIG. 3. An escape policy (e.g., $P_i$) includes an instruction, or a set of instructions, to a drive system or one or more actuators of the mobile cleaning robot (e.g., a wheel motor, a side brush motor, or a vacuum brush or roller motor), to get the mobile robot away from that stuck state. In an example, an escape policy $P_i$ may include recommended values of one or more robot motor units, such as one or more wheel motor parameters, one or more side brush motor parameters, one or more vacuum brush or roller motor parameters, among other actuator motor parameters, or a combination of parameters of different motors. Examples of the wheel motor parameters or the brush motor parameters may include, for example, speed, power, torque, direction, current output of the motor, or motor running time, or motor activation/deactivation pattern. In an example, an escape policy $P_i$ may include a sequence or a pattern of motions of a wheel motor, such as a combination of forward motion (driving the mobile robot forward) and backward motion (driving the mobile robot backward) in a specific manner. In an example, an escape policy $P_i$ may comprise wheel motor running backwards at a first speed $v_B$ (or a first power output $p_B$) for $t_B$ seconds, followed by running forward at a second speed $v_F$ (or a second power output $p_F$) for $t_F$ seconds.

The training module 514 may train the robot escape behavior model 515 using training data 511. The training data 511 may include sensor data associated with stuck states encountered by mobile robots, and robot behavior data that characterizes robot escape behavior responsive to the stuck states. The sensor data and the robot behavior data are collectively referred to as robot experience data. The sensor data may be collected from one or more sensors, such as those in the sensor system 320. By way of example and not limitation, the sensor data may include displacement data collected by an optical mouse sensor, actuator motor data such as motor current or velocity data from a wheel motor, a side brush motor, or a vacuum brush or roller motor, wheel encoder data, wheel drop data, cliff infrared values collected by an infrared sensor, angular rate data collected by a gyroscope sensor, data collected by a bumper sensor, data collected by an accelerometer, or image data collected by an camera sensor. In an example, a mobile cleaning robot may continuously collect sensor data. When the mobile robot enters into a stuck state (such as detected by the mobile robot), the sensor data associated with the stuck state, including the sensor data before, during, and after the stuck state, may be collected. The sensor data and robot behavior data, collectively known as the robot experience data, may be uploaded to the cloud computing system 510 as part of the training data 511. In an example, the data uploading can be activated manually by a user. In another example, the sensor data may be uploaded automatically. Data uploading can be performed periodically, or triggered by an event. With the uploaded robot experience data, the training module 514 may train an escape behavior model, or update an existing escape behavior model. In an example, the escape behavior model may be updated periodically or responsive to a trigger event.

In some examples, the sensor data of the training data 511 may be acquired from mobile cleaning robots that are categorized into the same group according to a grouping criterion. Mobile robots in the same group are referred to as a robot cohort. In an example, the mobile robots in the same cohort have similar capabilities of sensing various stuck states, and/or similar capabilities of escaping from a similar stuck. As such, one mobile robot's escape behavior may be applicable to another mobile robot in the same cohort to resolve a similar stuck state. The training module 514 may use sensor data gathered from the mobiles robots of the same group to train a robot escape behavior model for the mobile robots that belong to the same group.

Groups of mobile robots, or robot cohorts, may be identified based on different criteria. In an example, the robot cohort includes mobile cleaning robots of the same robot model or type. In another example, groups of mobile robots may be identified based on geographical regions of operation. In some examples, groups of mobile robots may be identified based on device age, such as days or years of operation. The device age may be counted from its first use (e.g., the first cleaning mission). Alternatively, the device age may be counted from a specific event, such as the first stuck and escape event in the mobile robot's environment. Mobile cleaning robots of substantially the same age, or within a specific age range (e.g., 0-6 months from first use), may be grouped into one robot cohort and get trained used the sensor data collected from the mobile robots in that cohort.

Additionally or alternatively, groups of mobile robots may be identified based on mobile robots' operating conditions or experiences with their respective environments. In an example, mobile cleaning robots that have substantially the same stuck occurrence rate or stuck occurrence rate falling within a specified range may be grouped into the same robot cohort. The stuck occurrence rate represents how often a mobile robot may get stuck in its environment during a cleaning mission. For example, a 10% stuck rate indicates a chance of getting stuck once every 10 cleaning missions. In another example, mobile cleaning robots may be grouped into a robot cohort based on the type of objects that cause the mobile robots to be stuck. For example, mobile cleaning robots that have their respective upper body portions jammed by substantially the same type of couch may be grouped into a robot cohort. In another example, the robot cohort includes mobile cleaning robots interacting with an obstacle at a specified location of an environment associated with a stuck state, such as a piece of furniture in a living room, or an appliance in the kitchen for example.

In some examples, instead of grouping mobile cleaning robots into robot cohorts and constructing training data 511 from sensors of the mobile robots in the same cohort, the training module 514 may automatically classify sensor data into different groups. For example, time series of sensor data collected from different mobile cleaning robots (including, for example, mobile robots of different types or models, different ages or age ranges, or different operating conditions or past experiences with their respective environments) may be grouped into different sensor data clusters using a clustering algorithm. An example of the clustering algorithm is a centroid-based clustering, such as such as k-means algorithm, that groups data into non-hierarchical clusters. Another example algorithm is density-based clustering that connects areas of high data density into clusters. Yet another clustering example is a distribution-based clustering algorithm, which clusters data into several groups with predetermined statistical distributions, such as Gaussian distributions. Other examples of clustering algorithms may include hierarchical clustering (or connectivity-based clustering), grid-based clustering, among others. A clustering module, separate from the training module 514, may group the training data 511 into different clusters. The clustering module may be implemented in the cloud computing system 510. The training module 514 can use the sensor data of the same cluster to train the robot escape behavior model 515. In some examples, the clustering module may be incorporated into the robot escape behavior model 515. For example, the clustering module may be implemented as one or more cluster selection layers of a neural network escape behavior model. The training module 514 may train the entire neural network model, including the one or more cluster selection layers and the escape behavior selection layers.

Figure 6:
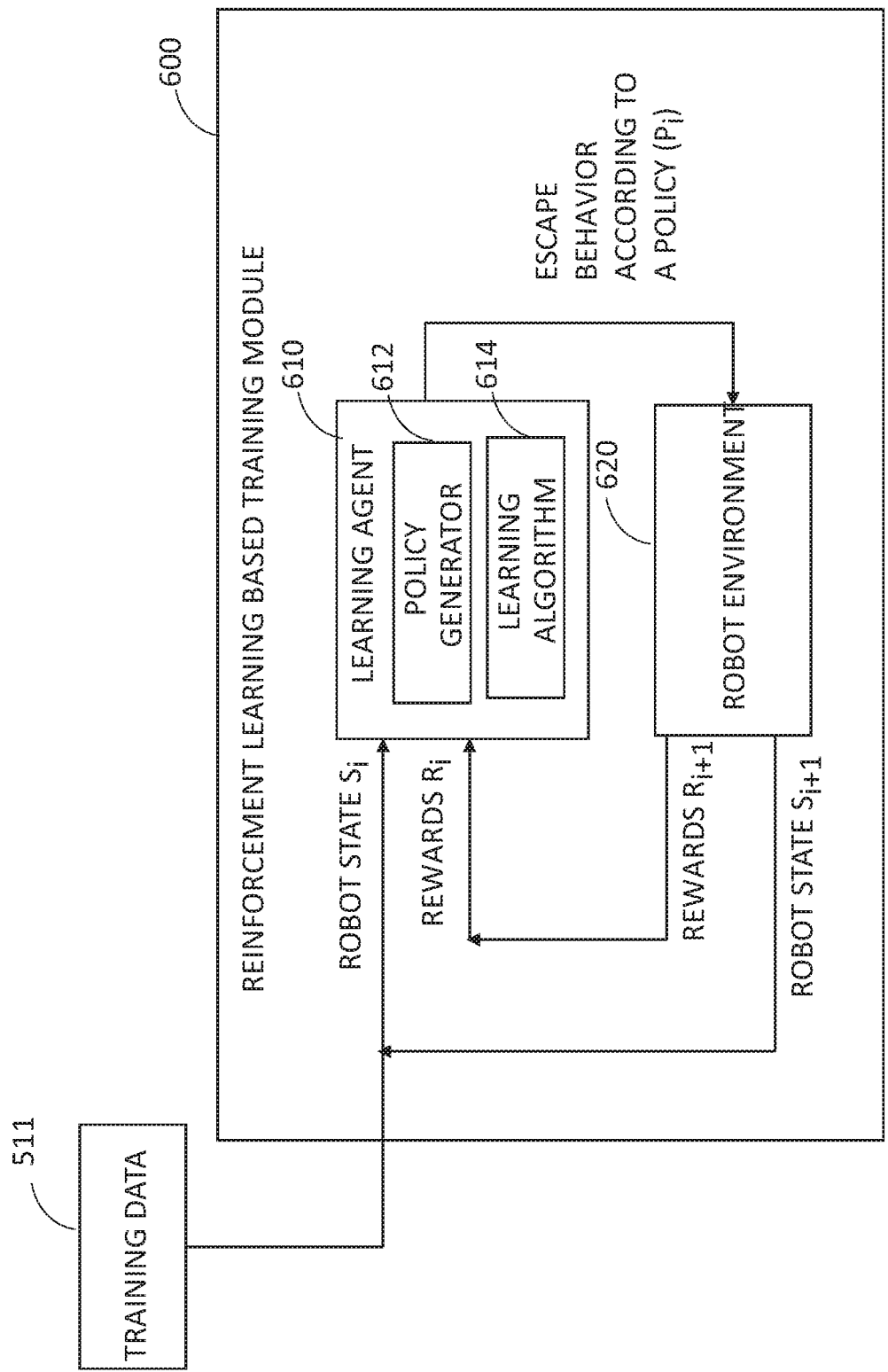
FIG. 6 is schematic of a reinforcement learning (RL)-based training module configured to learn escape policies from robot sensor and behavior data.

The training module 514 may train the robot escape behavior model 515 using the training data 511. A machine learning algorithm may be used in the model training. In an example, the training module 514 may use a reinforcement learning (RL) to train the robot escape behavior model 515. Referring now to FIG. 6, a schematic of a RL-based training module 600, which is an example of the training module 514, may include a learning agent 610 and a robot environment 620. The goal of RL is to train the learning agent 610 to complete a task within an uncertain environment. The learning agent 610 receives input including robot state $S_1$ (also referred to as observations), which may include sensor data associated with stuck states from the training data 511, and a reward $R_i$ from the robot environment 620. The reward $R_i$ is a measure of how successful an action is with respect to completing the task goal. The learning agent 610 may include a policy generator 612 and a learning algorithm 614. Based on the input, the policy generator 612 may determine a policy $P_i$. The policy $P_i$ can be a function approximator with tunable parameters, such as a deep neural network. The policy $P_i$ maps the robot state $S_i$ (the observation) to an instruction or a set of instructions to get the mobile robot away from the stuck state. The learning agent 610 may produce an action, such as an escape behavior, according to the policy $P_i$ to the environment 620 to resolve the stuck state. The execution of escape behavior according to policy $P_i$ puts the mobile robot to a next state $S_{i+1}$, and produces a next reward $R_{i+1}$, based on the performance of the present escape behavior.

The learning algorithm 614 may continuously update the policy parameters based on the observations (e.g., robot state $S_i$), rewards, and the actions (e.g., escape behaviors). The goal of the learning algorithm 614 is to find an optimal policy that maximizes the cumulative reward received during the task. In an example, for a particular stuck state, the learning algorithm 614 may assign respective numerical rewards to a plurality of candidate escape policies, and select from the plurality of candidate escape policies an escape policy that maximizes an expected value of the numerical rewards. In an example, the rewards can be based on a success or a failure of the mobile robot escaping from the stuck state, which may be determined based on whether the mobile robot escapes from the stuck state within a specified time period without user intervention. For example, a positive reward (e.g., +1) may be assigned to a policy leading to an successful escape, and a negative reward (e.g., −1) may be assigned to a policy leading to a failed escape. In another example, the rewards can be based on an efficiency indicator of escaping from the stuck state. The efficiency indicator may be determined based on, for example, the number attempts made before a successful escape, time spent to escape from the stuck state, or wheel motor or side brush motor power consumption for a successful escape, among others. For example, between two policies both leading to successful escapes, a higher reward may be assigned to a policy that leads to an escape behavior with fewer attempts, less time, or lower power consumption than to another policy that leads to an escape behavior with more attempts, more time, or higher power consumption. In some examples, an existing policy may be updated, and rewards may be assigned to a candidate policy different from the existing policy. As described above, the rewards can be positive rewards or negative rewards. When the cumulative rewards for the candidate policy satisfies a specific condition (e.g., exceeding a reward threshold), the candidate policy is deemed superior to the existing policy, and can replace the existing policy in the mobile robot.

Depending on the learning algorithm 614, various types of the learning agent 610 may be used. In an example, the learning algorithm 614 may be an on-policy learning algorithm, which uses experiences drawn from the current policy to make incremental updates towards an optimal policy. Alternatively, the learning algorithm 614 may be an off-policy learning algorithm that updates the current policy towards an optimal policy using experiences drawn from a policy different from the current policy. In an example, the learning algorithm 614 may be an on-policy implementation of the actor-critic learning algorithm, which is a model-free on-policy reinforcement learning method. The goal of an actor-critic agent is to optimize the policy (actor) directly, and train a value estimator (critic) to estimate the return or future rewards. In another example, the learning algorithm 614 may be a Q-learning algorithm. The Q-learning algorithm is a model-free off-policy reinforcement learning method. During training, a Q-learning agent can explore the action space using techniques such as an epsilon-greedy exploration. In some examples, a batch reinforcement learning algorithm may be used, which learns policies from a fixed dataset without further interactions with the environment, thereby reducing the time, effort, cost, and risk associated with acquiring additional data.

Referring back to FIG. 5, the cloud computing system 510 may include a validation module 516 to validate the robot escape behavior model 515 generated by the training module 514. The validation is a process of assessing the validity and efficacy of the trained model before releasing it to a mobile cleaning robot in the field. As illustrated in FIG. 5, the validation module 516 may validate the robot escape behavior model 515 against validation data 512. The validation data 512 may be a different data set than the training data 511. In an example, the training module 514 may construct the training data using robot experience data (including sensor data and the robot behavior data) collected from the mobile robots during synthetic stuck-and-escape scenarios such as performed in a controlled lab setting, hereinafter referred to as stuck-and-escape simulations. Upon completion of the training, the trained robot escape behavior model 515 may be deployed to mobile robots in the field environments to collect validation data 512. The mobile robots in the field collect sensor data, robot behavior data, and rewards corresponding to stuck-and-escape events, collectively referred to as fleet data, while performing regular cleaning missions in their respective environments. The fleet data may be uploaded to the cloud computing system 510 and establish validation data 512. The validation module 516 may validate the robot escape behavior model 515 against the validation data 512.

In another example, the training module 514 may construct the training data using the fleet data, including sensor data, robot behavior data, and rewards corresponding to stuck-and-escape events when the mobile robots perform regular cleaning missions in the field. After the model training, the trained robot escape behavior model 515 may be deployed to mobile robots in a lab, where stuck-and-escape simulations may be performed and robot experience data (including sensor data and the robot behavior data) are collected from the mobile robots during the stuck-and-escape simulations. The simulation data may be uploaded to the cloud computing system 510 to establish the validation data 512. The validation module 516 may validate the robot escape behavior model 515 against the validation data 512.

The robot escape model is deemed to pass the validation if a validation criterion is satisfied, such as a successful escape rate determined from the validation data exceeding a threshold rate, or an escape efficiency indicator (e.g., average time taken or average power consumption to escape) falls within a specific range. The robot escape behavior model that passes the validation may be stored in a knowledge base 518 of the computing system 510.

In some examples, in addition to validating (e.g., confirming or rejecting) the escape behavior model learned by the training module 514, the validation module 516 may tune the trained escape behavior using the validation data 512. For example, the validation module 516 may modify at least a portion of the trained escape behavior. In another example, the validation module 516 may learn a new, distinct escape behavior different from the trained escape behavior under the same or a different stuck state. The new escape behavior learned from validation may be supplemented to the behaviors learned by the training module 514 and validated by the validation module 516.

The robot escape behavior model 515, or a portion thereof, may be deployed to the mobile cleaning robot 520, such as via a wireless communication link. The deployment may be carried out in response to a download request by the mobile cleaning robot 520, such as under a user command via the user interface 530. The mobile cleaning robot 520 can be an example of the mobile robot 100. As illustrated in FIG. 5, the mobile cleaning robot 520 may include a memory 521, a sensor circuit 522, a controller circuit 524, and a drive system 528. The memory 521, which is an example of the memory storage element 144 in the mobile robot 100, may be configured to store the robot escape behavior model 515. The memory 521 may store sensor data acquired by the sensor circuit 522. In an example, the memory 521 may store robot experience data, including sensor data and the robot behavior data. The stored robot experience data pertaining to the mobile cleaning robot 520 may be uploaded to the cloud computing system 510 as a part of the training data 511 or the validation data 512.

In an example where the trained robot escape behavior model 515 includes distinct models for respective robot cohorts identified based on different robot grouping criteria, the controller circuit 524 may recognize the mobile cleaning robot 520 as belong to one of the robot cohorts, and to download a portion of the trained robot escape behavior model 515 that corresponds to the recognized robot cohort. Such a cohort-specific escape behavior model that matches the mobile cleaning robot 520 may lead to a higher escape success rate and efficiency.

The sensor circuit 522 of the mobile cleaning robot 520 may include one or more sensors including, for example, optical sensors, cliff sensors, proximity sensors, bump sensors, imaging sensor, or obstacle detection sensors, among other sensors such as discussed above with reference to FIGS. 2A-2B and 3. Some of the sensors may sense obstacles (e.g., occupied regions such as walls) and pathways and other open spaces within the environment. Similar to the discussion above regarding the training data 511, the sensor circuit 522 may collect sensor data responsive to a stuck state, including sensor data before, during, and after the stuck state. Examples of the sensor data may include displacement data collected by an optical mouse sensor, actuator motor data such as motor current or velocity data from a wheel motor, a side brush motor, or a vacuum brush or roller motor, wheel encoder data, wheel drop data, cliff infrared values collected by an infrared sensor, angular rate data collected by a gyroscope sensor, data collected by a bumper sensor, data collected by an accelerometer, or image data collected by an camera sensor. The sensor circuit 522 may collect sensor data at a specific sampling rate. In an example, the sensor data may be collected at a sampling rate of two samples per second. Other sampling rates may be used.

The controller circuit 524, which is an example of the controller circuit 109, can detect a stuck event and generate control signals to resolve the stuck such as allowing the mobile robot to move away from the stuck state. In an example, the controller circuit 524 may be included in a handheld computing device, such as the mobile device 404. Alternatively, the controller circuit 524 may be at least partially included in a mobile robot, such as the mobile robot 100. The controller circuit 524 may be implemented as a part of a microprocessor circuit, which may be a dedicated processor such as a digital signal processor, application specific integrated circuit (ASIC), microprocessor, or other type of processor for processing information including physical activity information. Alternatively, the microprocessor circuit may be a processor that may receive and execute a set of instructions of performing the functions, methods, or techniques described herein.

The controller circuit 524 may include circuit sets comprising one or more other circuits or sub-circuits, such as a stuck state detector 525 and an escape resolution generator 526. These circuits or modules may, alone or in combination, perform the functions, methods, or techniques described herein. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

The stuck state detector 525 may detect the mobile cleaning robot 520 being stuck in the environment while performing a cleaning mission, such as by using the sensor data from the sensor circuit 522. In an example, the detection of a wheel drop event may indicate that the robot has driven up onto an obstacle and has entered a stuck state. The escape resolution generator 526 may receive the trained robot escape behavior model 515, or a portion thereof, downloaded from the cloud system 510 and stored in the memory 521. In response to a detection of stuck state, the escape resolution generator 526 may apply the sensor data corresponding to the detected stuck state to the trained robot escape behavior model 515 to determine an escape policy to resolve the present stuck state. In an example where a cohort-specific escape behavior model (i.e., a portion of the trained robot escape behavior model 515 that matches the mobile cleaning robot 520) is downloaded and stored in the memory 521, the escape resolution generator 526 may apply the collected sensor data corresponding to the detected stuck state to the stored cohort-specific escape behavior model to determine the escape policy for the detected stuck state.

The controller circuit 524 may generate a control signal to the drive system 528. The drive system 528 may activate motions of the wheels and/or side brushes in accordance with the determined escape policy, which may remove the mobile cleaning robot 520 from the detected stuck state.

The user interface 530, which may be implemented in a handheld computing device such as the mobile device 404, includes a user input 532 and a display 534. The user input 532 may include user controls that allow a user to create a cleaning mission, and control the mobile cleaning robot 520 to execute the cleaning mission. In various examples, the user input 532 may allow a user to establish data communication between the mobile cleaning robot 520 and the cloud computing system 510. For example, a user may send a command to the controller circuit 524 to upload the sensor data collected under different stuck states to the cloud computing system 510 as a part of the training data 511 or the validation data 512. In another example, a user to send a command to the controller circuit 524 to request one or more cloud services in the cloud computing system 510, such as a request to download the robot escape behavior model 515, or a portion thereof, to the mobile cleaning robot 520. In some examples, the data communication between the mobile cleaning robot 520 and the cloud computing system 510, including uploading sensor data and downloading the robot escape behavior model, can be initiated automatically without user intervention.

In some examples, the user input 532 may allow a user to send command to the controller circuit 524 to customize the robot escape behavior model 515 or a portion thereof downloaded from the cloud computing system and stored in the memory 521. The robot escape behavior model can be tuned using the sensor data corresponding to the stuck states as collected by the sensor circuit 522. Such a local-tuning of a robot escape behavior model tuning at the local mobile cleaning robot 520 is an alternative to the periodical or event-triggered remote model update at the cloud computing system 510. The locally tuned, customized escape behavior model may be more adaptable to the mobile cleaning robot 520 and its cleaning environment.

Figure 7:
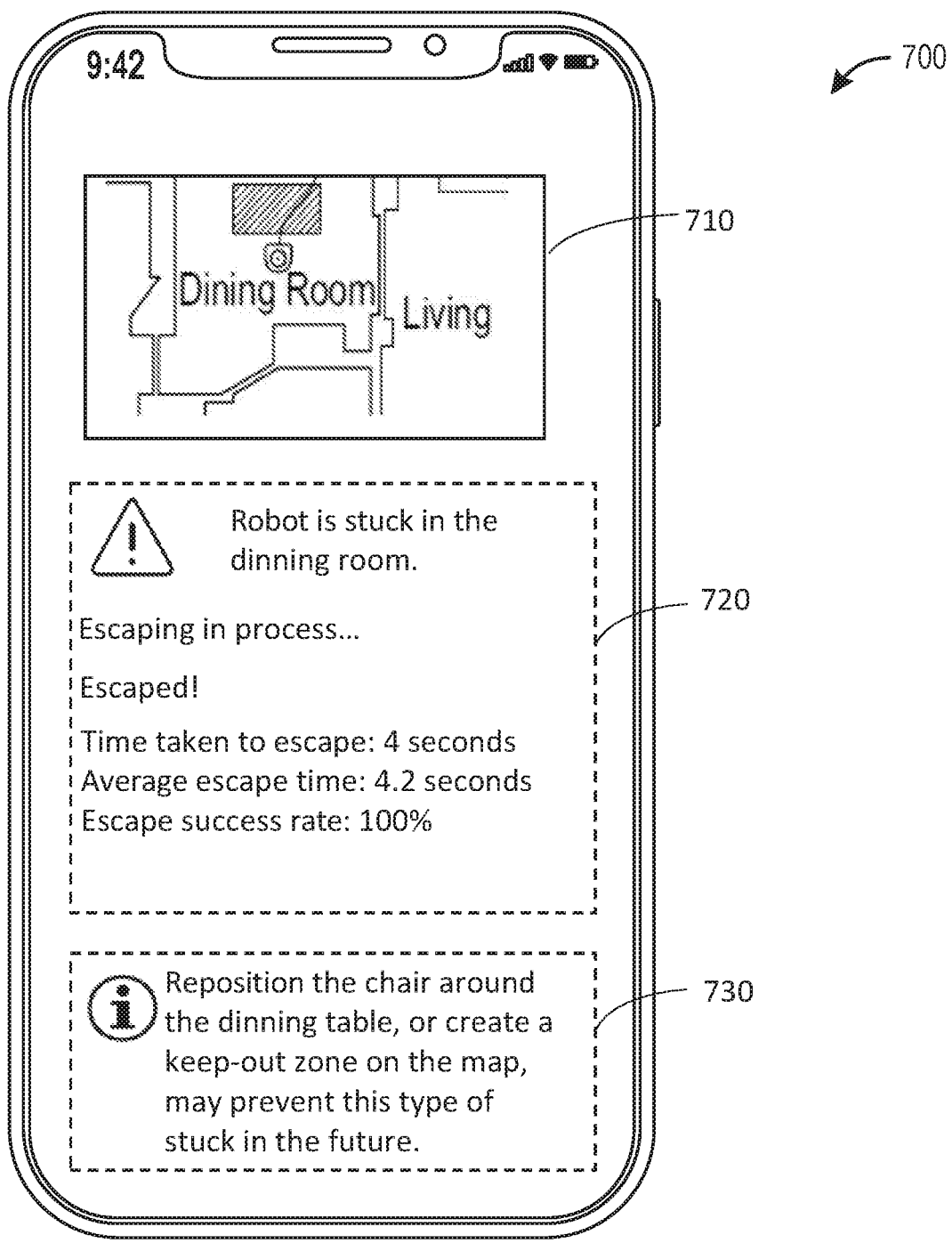
FIG. 7 illustrate a portion of a user interface of a handheld mobile device displaying information about stuck state and robot escape behavior.

The display 534 may display a map of the environment and information of the mobile cleaning robot 520 while performing a cleaning mission. In some examples, the display 534 may display a stuck-and-escape report of information about a detected stuck state and the mobile robot's escaping behavior from the stuck state. Referring to FIG. 7, a handheld mobile device (e.g., a mobile phone) includes a display to display a map 710 of at least a portion of the environment where the robot is detected to be stuck, such as in a dining room in this example. A stuck-and-escape report 720 may include a notification of the stuck state, type of stuck detected, object causing or otherwise related to the stuck, location in the robot environment where the stuck occurs, and progress of resolving the stuck, among others. In an example, the report 720 may include statistics of the mobile robot's past stuck-and-escape experience, such as successful escape rate, escape efficiency (e.g., average time spent to escape). The user may take actions based on the stuck-and-escape report. In an example, a suggested action 730 may be displayed on the display 534. For example, if the statistics indicate that a particular object frequently causes the mobile robot to be stuck, a recommendation may be displayed to the user, such as removing or repositioning the object, adding a keep-out zone on the map, or placing a virtual wall beacon for the mobile robot.

Examples of Methods of Managing Stuck Using a Learned Escape Model

Figure 8:
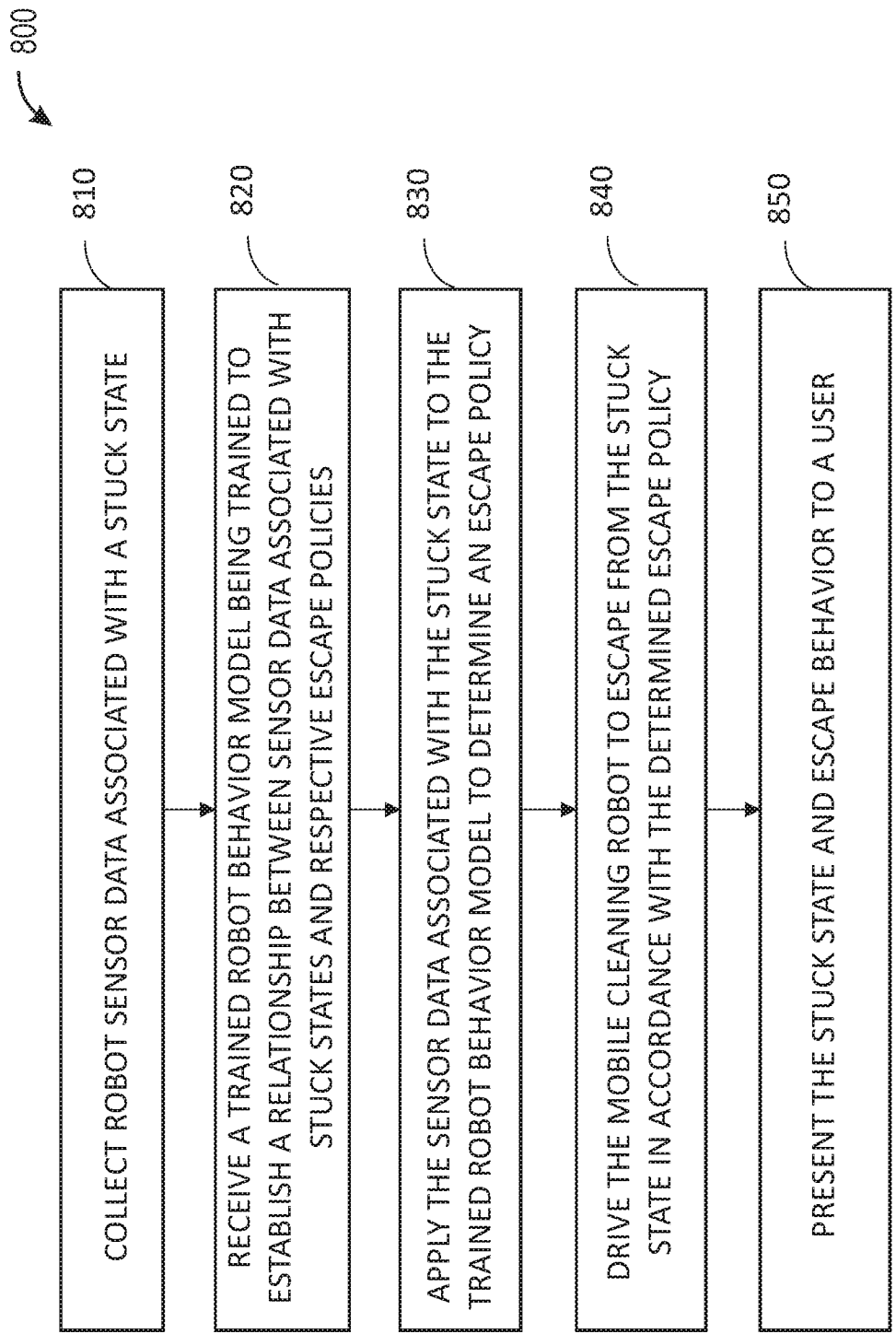
FIG. 8 is a flow diagram illustrating an exemplary method of operating a mobile cleaning robot to manage a stuck event in an environment.

FIG. 8 is a flow diagram illustrating an example of a method 800 of operating a mobile cleaning robot (such as the mobile robot 100 or a variant thereof) to manage a stuck event in an environment. The method 800 can be implemented in, and executed by, the robot escape management system 500. Although the stuck management is described herein with respect to a mobile cleaning robot, the method 800 may be used for detecting and escaping from stuck events in a variety of other mobile robots including, for example, a mobile mopping robot, a lawn mowing robot, or a space-monitoring robot.

The method 800 commences at step 810 to collect robot data associated with a stuck state that prevents a mobile cleaning robot from driving in an environment. The robot data includes sensor data sensed by variety of sensors, such as optical sensors, cliff sensors, proximity sensors, bump sensors, imaging sensor, or obstacle detection sensors, among other sensors such as discussed above with reference to FIGS. 2A-2B and 3. Some of the sensors may sense obstacles (e.g., occupied regions such as walls) and pathways and other open spaces within the environment. Sensor data may be collected by, for example, the sensor circuit 522. Examples of the sensor data may include displacement data collected by an optical mouse sensor, actuator motor data such as motor current or velocity data from a wheel motor, a side brush motor, or a vacuum brush or roller motor, wheel encoder data, wheel drop data, cliff infrared values collected by an infrared sensor, angular rate data collected by a gyroscope sensor, data collected by a bumper sensor, data collected by an accelerometer, or image data collected by an camera sensor.

At 820, a trained robot escape behavior model may be received by the mobile cleaning robot. The robot escape behavior model is trained to establish a relationship between sensor data associated with one or more stuck states and respective escape policies each including an instruction to the drive system or one or more actuators to remove the mobile cleaning robot from a corresponding stuck state. The escape policies may include recommended values of one or more robot motor units, such as one or more parameters of the wheel motor, one or more parameters of the side brush motor, one or more vacuum brush or roller motor parameters, among other actuator motor parameters, or a combination of parameters of different motors. Examples of the above-mentioned motor parameters may include speed, power, torque, direction, current output of the motor, or motor running time, or motor activation/deactivation pattern. In an example, an escape policy may include wheel motor running forward or backward in an intermittent on/off pattern.

Figure 9:
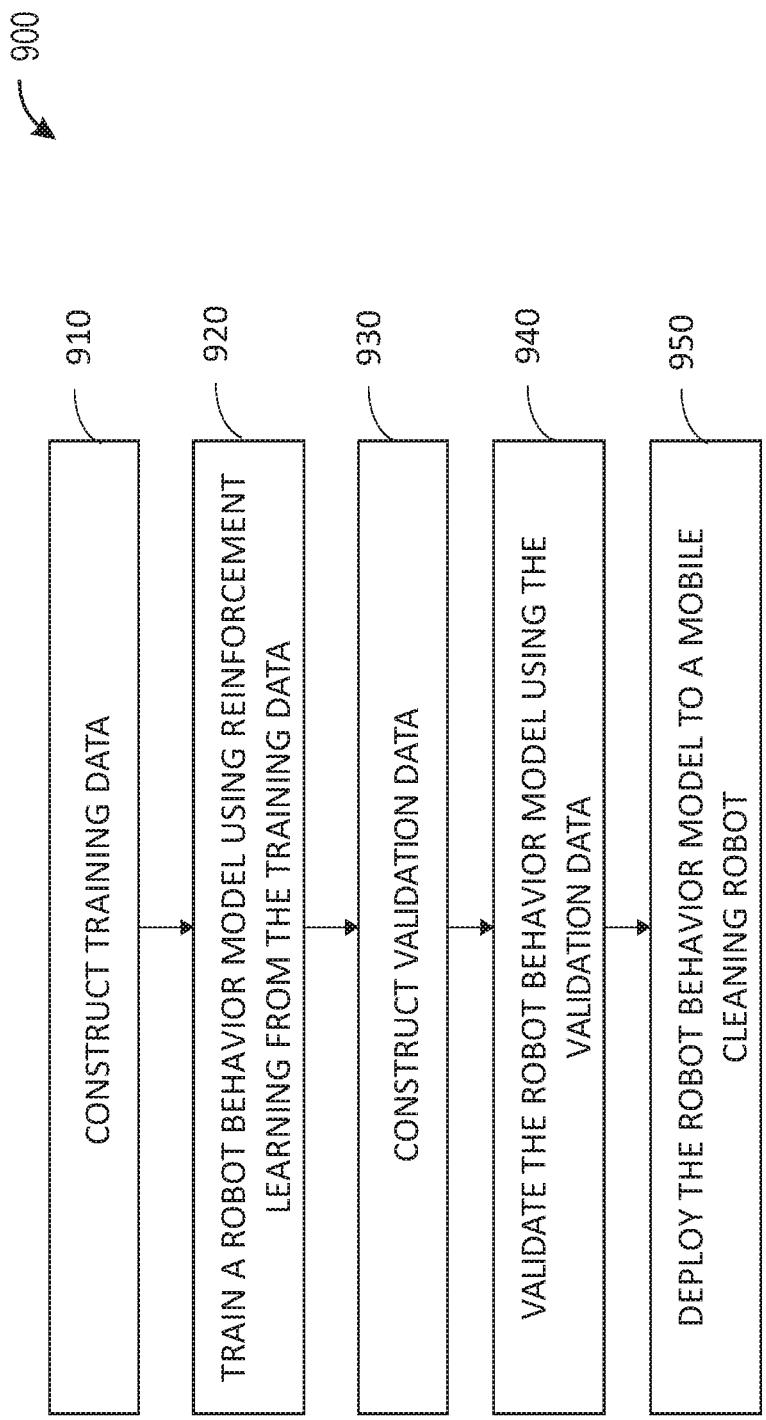
FIG. 9 is a flow diagram illustrating an exemplary method of training an RL-based robot escape behavior model.

The robot escape behavior model may be trained using a training module in a remote computing device separate from the mobile cleaning robot, such as the training module 514 in the cloud computing system 510, as illustrated in FIG. 5. Referring to FIG. 9, an example of a method 900 of training a robot escape behavior model may be based on a reinforcement learning (RL) method, such as using the RL-based training module 600 as illustrated in FIG. 6. The method 900 comprises constructing training data at 910, and training the robot escape behavior model (the robot escape behavior model) at 920 using the RL method from the training data. As discussed above in FIG. 5, the training data may include sensor data corresponding to stuck events encountered by mobile robots, and robot behavior data corresponding to robot escape behavior responsive to stuck states, collectively referred to as robot experience data. In some examples, the training data may be acquired from mobile cleaning robots categorized into the same group, also referred to as a robot cohort, according to a specific grouping criterion. For example, the robot cohort may be identified as mobile cleaning robots of a specified robot model, type, or a geographical region of operation, mobile cleaning robots of the same age (e.g., a specified number or range of days of operation) counted from its first use (e.g., the first cleaning mission) or counted from a specific event, such as the first stuck and escape event in the mobile robot's environment. In some examples, the robot cohort may be identified as mobile cleaning robots with similar experiences with their respective environments. For example, a robot cohort may include mobile cleaning robots having a specified stuck occurrence rate or rate range, mobile cleaning robots interacting with a specified type of obstacle associated with a stuck state, or mobile cleaning robots interacting with a specified type of obstacle at a specified location of an environment associated with a stuck state.

As discussed above, mobile robots in the same group may have similar capabilities of sensing various stuck states. Their capabilities of escaping from similar stuck states may be similar to each other than mobile robots in different groups. As such, one mobile robot's escape behavior that successfully resolve a stuck situation may be equally effective in resolving a similar stuck state encountered by another mobile robot in the same group.

In some examples, time series of sensor data collected from different mobile cleaning robots may be grouped into different clusters using a clustering algorithm. Training data can be constructed using sensor data in the same cluster, and used to train the robot escape behavior model. In an example, the clustering module may be incorporated into the robot escape behavior model, such as a cluster selection layer of a neural network of the robot escape behavior model. The clustering of sensor data may be trained along with the rest of the robot escape behavior model, such as the reinforcement learning of escape policies.

At 920, the training data generated at 910 may be used to train a robot escape behavior model. The training may be based on reinforcement learning (RL), as described above with reference to FIG. 6. The RL learning algorithm can be an on-policy learning, or alternatively an off-policy learning algorithm. The RL learning involves operations of, for target stuck state, assigning respective numerical rewards to a plurality of candidate escape policies, and selecting, from the plurality of candidate escape policies, an escape policy that maximizes an expected value of the numerical rewards. The numerical rewards may be determined based on the success or failure of escaping from the stuck state. Additionally or alternatively, the numerical rewards may be determined based on an efficiency indicator of escaping from the stuck state, or time taken to escape from the stuck state.

The trained robot escape behavior model may be validated before being deployed to mobile robots in the field. At 930, validation data may be constructed. The validation data may be a different data set than the training data. For example, one of the training data or the validation data include sensor data collected from first mobile cleaning robots during stuck-and-escape simulations such as performed in a lab, and the other of the training data or the validation data include sensor data collected from second mobile cleaning robots, distinct from the first mobile cleaning robots, while performing regular cleaning missions in respective environments.

In addition to the sensor data corresponding to the stuck-and-escape events, the training data constructed at 910 and the validation data constructed at 930 may each include respective mobile cleaning robots' behavior data corresponding to the stuck-and-escape events and corresponding rewards. For example, the training data may include sensor data, escape behavior data, and rewards correspondent to stuck-and-escape events encountered by a first plurality of mobile cleaning robots during stuck-and-escape simulations such as performed in a lab. Similarly, the validation data may include sensor data, escape behavior data, and rewards correspondent to stuck-and-escape events encountered by a second plurality of mobile cleaning robots in the field during regular cleaning missions in their respective environments.

At 940, the trained robot escape behavior model may be validated against the validation data to assess the model's validity and efficacy, such as using the validation module 516. The robot escape model is deemed to pass the validation if a validation criterion is satisfied, such as a successful escape rate determined from the validation data exceeding a threshold rate, or an average escape efficiency indicator (e.g., average time or power consumption) falls within a specific range.

At 950, the robot escape behavior model, or a portion thereof, may be deployed to the mobile cleaning robot, such as via a wireless communication link.

Referring back to FIG. 8, a mobile cleaning robot may receive the validated trained robot escape behavior model such as generated using the method 900. The deployment of the model to the mobile cleaning robot may be carried out in response to a download request by the mobile cleaning robot. In an example where the trained robot escape behavior model includes distinct models for respective robot cohorts, a proper robot cohort that matches the mobile cleaning robot may be identified, and the corresponding escape model (or a portion thereof) may be downloaded.

At 830, the sensor data collected at 810 may be applied to the received robot escape behavior model to determine an escape policy, such as using the escape resolution generator 526. In an example, the escape policy may be triggered by a stuck event that is detected while the mobile cleaning robot is performing a cleaning mission, such as using the stuck state detector 525. In an example, the collected sensor data corresponding to the detected stuck state may be applied to a cohort-specific escape behavior model (i.e., a portion of the trained robot escape behavior model that matches the mobile cleaning robot) to determine the escape policy for the detected stuck state.

At 840, the mobile cleaning robot may escape from the stuck state in accordance with the determined escape policy. For example, in accordance with a control signal from the controller circuit 524 of the mobile cleaning robot, the drive system 528 may generate motions of the wheels and/or side brushes to allow the mobile cleaning robot to escape from the detected stuck state.

At 850, information about the detected stuck state and the mobile robot's escaping behavior from the stuck state may be presented to a user, such as via a user interface on a handheld mobile device (e.g., a mobile phone). A stuck-and-escape report may be generated and displayed, which may include one or more of a map of at least a portion of the environment where the robot is detected to be stuck, notification of the stuck event, type of stuck detected, object causing the stuck, location in the robot environment where the stuck occurs, and progress of resolving the stuck, or statistics of the mobile robot's past stuck-and-escape experience, among others. A suggested user action or intervention may be presented to the user such as removing or repositioning the object, adding a keep-out zone on a map, or placing a virtual wall beacon for the mobile robot, to avoid or reduce the change of the mobile robot being stuck in the same location in the future.

Examples of Machine-Readable Medium for Robot Scheduling and Controlling

Figure 10:
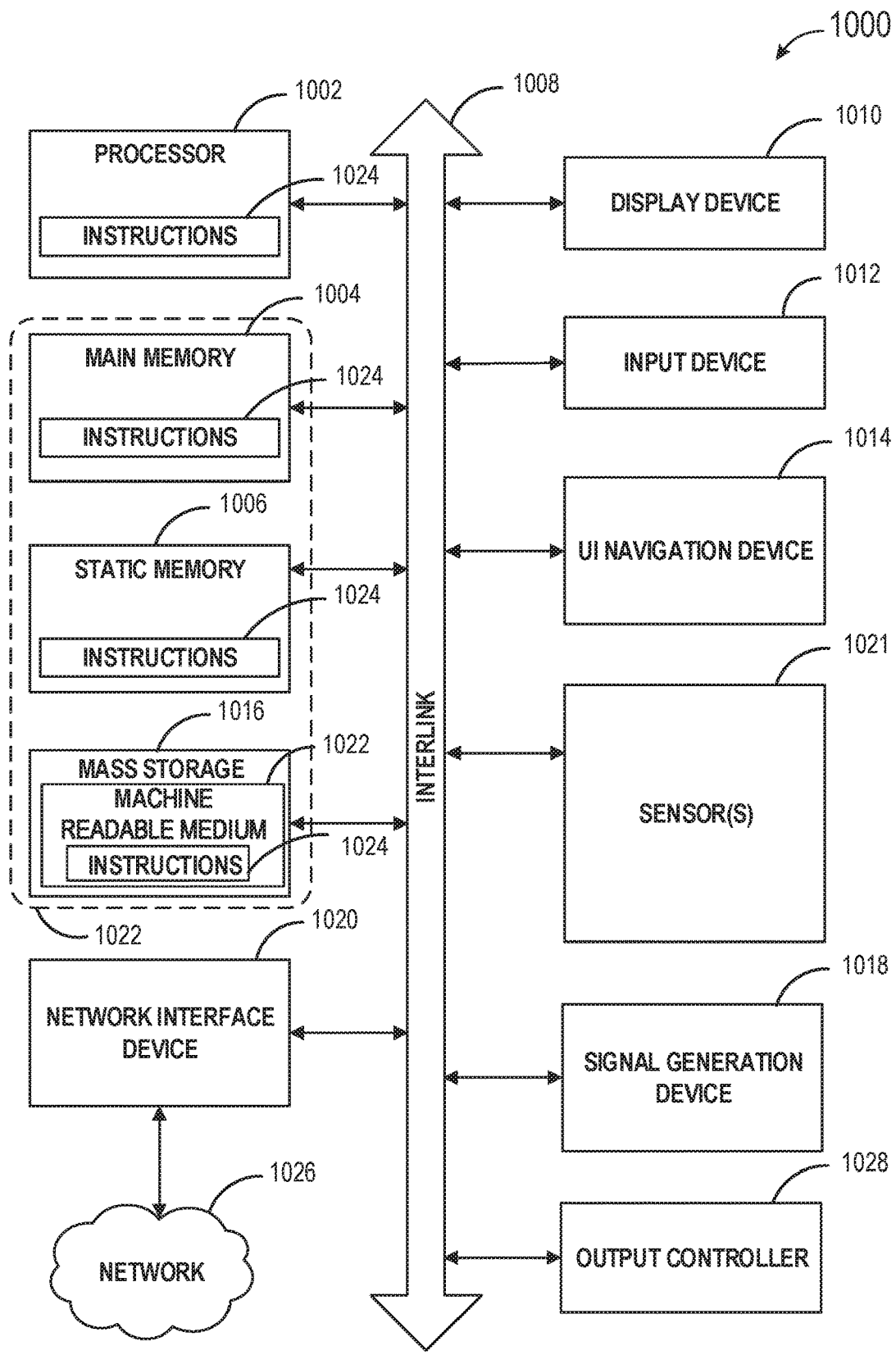
FIG. 10 is a block diagram illustrating an example machine upon which any one or more of the techniques (e.g., methodologies) discussed herein may perform.

FIG. 10 illustrates generally a block diagram of an example machine 1000 upon which any one or more of the techniques (e.g., methodologies) discussed herein may perform. Portions of this description may apply to the computing framework of various portions of the mobile robot 100, the mobile device 404, or other computing system such as a local computer system or the cloud computing system 406.

In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display unit 1010 (e.g., a raster display, vector display, holographic display, etc.), an alphanumeric input device 1012 (e.g., a keyboard), and a user interface (UI) navigation device 1014

(e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensors. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine-readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EPSOM)) and flash memory devices, magnetic disks, such as internal hard disks and removable disks; magneto-optical disks; and CD-ROM and DVD-ROM disks.

The instructions 1024 may further be transmitted or received over a communication network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as WiFi®, IEEE 802.16 family of standards known as WiMax®), IEEE 802.15.4 family of standards, peer-to-peer (P2P) networks, among others. In an example, the network interface device 1020 may include one or more physical jacks (e.g., Ethernet, coaxial, or phone jacks) or one or more antennas to connect to the communication network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software.

Various embodiments are illustrated in the figures above. One or more features from one or more of these embodiments may be combined to form other embodiments.

The method examples described herein can be machine or computer-implemented at least in part. Some examples may include a computer-readable medium or machine-readable medium encoded with instructions operable to configure an electronic device or system to perform methods as described in the above examples. An implementation of such methods may include code, such as microcode, assembly language code, a higher-level language code, or the like. Such code may include computer readable instructions for performing various methods. The code can form portions of computer program products. Further, the code can be tangibly stored on one or more volatile or non-volatile computer-readable media during execution or at other times.

The above detailed description is intended to be illustrative, and not restrictive. The scope of the disclosure should therefore be determined with references to the appended claims, along with the full scope of equivalents to which such claims are entitled.

What is claimed is:
1. A system comprising:
a mobile cleaning robot, comprising:
a drive system including at least one electric motor configured to move the mobile cleaning robot about an environment;
a sensor circuit configured to collect sensor data associated with a stuck state preventing the mobile cleaning robot from driving in the environment;
a training module configured to select, from a set of mobile cleaning robots, a cohort fewer than the set of mobile cleaning robots and satisfying a robot grouping criterion, and to generate a trained robot escape behavior model using sensor data collected from the selected cohort of mobile cleaning robots, the trained robot escape behavior model being trained to establish a relationship between (1) training sensor data associated with one or more stuck states and (2) respective escape policies each including an instruction to the drive system or an actuator of the mobile cleaning robot to get the mobile cleaning robot away from a corresponding stuck state; and
a controller circuit configured to:
detect a stuck event that has occurred and prevented the mobile cleaning robot from driving in the environment;
use the detected stuck event to trigger a determination of an escape policy by applying the collected sensor data associated with the stuck state to the trained robot escape behavior model; and generate a control signal to the drive system or the actuator to escape from the stuck state in accordance with the determined escape policy.

2. The system of claim 1, wherein the training sensor data for the trained robot escape behavior model include at least one of:
displacement data;
actuator motor data;
wheel encoder data;
wheel drop data;
cliff infrared values collected by an infrared sensor;
angular rate data collected by a gyroscope sensor;
data collected by a bumper sensor; or
data collected by an accelerometer.

3. The system of claim 1, wherein the training sensor data for the trained robot escape behavior model include image data collected by a camera sensor.

4. The system of claim 1, wherein the sensor circuit is configured to collect the sensor data at a sampling rate of two samples per second.

5. The system of claim 1, wherein the escape policies for the trained robot escape behavior model include recommended parameter values of at least one of a wheel motor parameter, a side brush motor parameter, or a vacuum brush or roller motor parameter.

6. The system of claim 1, wherein:
the training module is in a remote computing device separate from and operatively in communication with the mobile cleaning robot; and
the controller circuit of the mobile cleaning robot is configured to receive the trained robot escape behavior model from the remote computing device.

7. The system of claim 6, wherein the remote computing device is a cloud-computing device or networked devices.

8. The system of claim 1, wherein the training module is configured to identify the robot cohort comprising mobile cleaning robots of a specified robot model, type, or a geographical region of operation.

9. The system of claim 1, wherein the training module is configured to identify the robot cohort comprising mobile cleaning robots with a specified number or range of days of operation.

10. The system of claim 1, wherein the training module is configured to identify the robot cohort comprising mobile cleaning robots having a specified stuck occurrence rate or rate range.

11. The system of claim 1, wherein the training module is configured to identify the robot cohort comprising mobile cleaning robots interacting with a specified type of obstacle associated with a stuck state.

12. The system of claim 1, wherein the training module is configured to identify the robot cohort comprising mobile cleaning robots interacting with a specified type of obstacle at a specified location of an environment associated with a stuck state.

13. The system of claim 1, wherein the training module is configured to identify one or more clusters of time series of the training sensor data collected from a plurality of mobile cleaning robots, and to construct the training data using the training sensor data within an identified cluster.

14. The system of claim 1, wherein:
the training module is configured to generate two or more trained robot escape behavior models for respective robot cohorts satisfying respective robot grouping criteria; and
the controller circuit of the mobile cleaning robot is configured to recognize the mobile cleaning robot as belong to one of the robot cohorts, and to apply the collected sensor data associated with the stuck state to one of the trained robot escape behavior models corresponding to the recognized robot cohort to determine the escape policy.

15. The system of claim 1, wherein the trained robot escape behavior model includes a neural network model.

16. The system of claim 1, wherein the training module is configured to generate the trained robot escape behavior model using reinforcement learning including, for a target stuck state:
assign respective numerical rewards to a plurality of candidate escape policies; and
select, from the plurality of candidate escape policies, an escape policy that maximizes an expected value of the numerical rewards.

17. The system of claim 16, wherein the reinforcement learning used for generating the trained robot escape behavior model includes an on-policy learning algorithm.

18. The system of claim 16, wherein the reinforcement learning used for generating the trained robot escape behavior model includes an off-policy learning algorithm.

19. The system of claim 16, wherein the training module is configured to assign the respective numerical rewards based on at least one of:
success or failure of escaping from the stuck state;
an efficiency indicator of escaping from the stuck state; or
time taken to escape from the stuck state.

20. The system of claim 1, further comprising a validation module configured to validate the trained robot escape behavior model against validation data different from the training data, and
wherein the controller circuit of the mobile cleaning robot is configured to apply the collected sensor data associated with the stuck state to the validated robot escape behavior model to determine the escape policy if a validation criterion is satisfied.

21. The system of claim 20, wherein:
the training module is configured to construct the training data using first training sensor data collected from first mobile cleaning robots during stuck-and-escape simulations; and
the validation module is configured to construct the validation data using second training sensor data collected from second mobile cleaning robots, distinct from the first mobile robots, while performing cleaning missions in respective environments.

22. The system of claim 20, wherein:
the training module is configured to construct the training data using second training sensor data collected from second mobile cleaning robots while performing cleaning missions in respective environments; and
the validation module is configured to construct the validation data using first training data collected from first mobile cleaning robots, distinct from the second mobile robot, during stuck-and-escape simulations.

23. The system of claim 1, wherein the training module is configured to update the trained robot escape behavior model periodically or responsive to a trigger event.

24. The system of claim 1, wherein the controller circuit of the mobile cleaning robot is configured to update the trained robot escape behavior model periodically or responsive to a trigger event.

25. The system of claim 1, comprising a user interface configured to present to a user information about the stuck state and the robot escape behavior of the mobile cleaning robot from the stuck state.

26. A method of operating a mobile cleaning robot in an environment, the method comprising:
- collecting robot sensor data associated with a stuck state that prevents the mobile cleaning robot from driving in the environment;
- selecting, from a set of mobile cleaning robots, a cohort fewer than the set of mobile cleaning robots and satisfying a robot grouping criterion;
- generating a trained robot escape behavior model using sensor data collected from the selected cohort of mobile cleaning robots, the trained robot escape behavior model being trained to establish a relationship between (1) training sensor data associated with one or more stuck states and (2) respective escape policies each including an instruction to get the mobile cleaning robot away from a corresponding stuck state;
- detecting a stuck event that has occurred and prevented the mobile cleaning robot from driving in the environment;
- using the detected stuck event to trigger a determination of an escape policy by applying the collected sensor data associated with the stuck state to the trained robot escape behavior model; and
- generating a control signal to a drive system or an actuator of the mobile cleaning robot to escape from the stuck state in accordance with the determined escape policy.

27. The method of claim 26, wherein the escape policies for the trained robot escape behavior model include recommended parameter values of at least one of a wheel motor parameter, a side brush motor parameter, or a vacuum brush or roller motor parameter.

28. The method of claim 26, wherein the robot cohort comprises at least one of:
- mobile cleaning robots of a specified robot model, type, or a geographical region of operation;
- mobile cleaning robots with a specified number or range of days of operation;
- mobile cleaning robots having a specified stuck occurrence rate or rate range;
- mobile cleaning robots interacting with a specified type of obstacle associated with a stuck state; or
- mobile cleaning robots interacting with a specified type of obstacle at a specified location of an environment associated with a stuck state.

29. The method of claim 26, comprising:
- identifying one or more clusters of time series of training sensor data collected from a plurality of mobile cleaning robots; and
- constructing the training data using the training sensor data within an identified cluster.

30. The method of claim 26, wherein the trained robot escape behavior model includes two or more behavior models for respective robot cohorts satisfying respective robot grouping criteria, the method further comprising:
- recognizing the mobile cleaning robot as belong to one of the robot cohorts; and
- applying the collected sensor data associated with the stuck state to one of the trained robot escape behavior models corresponding to the recognized robot cohort to determine the escape policy.

31. The method of claim 26, wherein generating the trained robot escape behavior model includes training the robot escape behavior model using reinforcement learning including, for a target stuck state:
- assigning respective numerical rewards to a plurality of candidate escape policies; and
- selecting, from the plurality of candidate escape policies, an escape policy that maximizes an expected value of the numerical rewards.

32. The method of claim 31, wherein assigning the respective numerical rewards is based on at least one of:
- success or failure of escaping from the stuck state;
- an efficiency indicator of escaping from the stuck state; or
- time taken to escape from the stuck state.

33. The method of claim 26, comprising:
- validating the trained robot escape behavior model against validation data different from the training data; and
- applying the collected sensor data associated with the stuck state to the validated robot escape behavior model to determine the escape policy if a validation criterion is satisfied.

34. The method of claim 33, wherein:
- one of the training data or the validation data include first training sensor data collected from first mobile cleaning robots during stuck-and-escape simulations; and
- another of the training data or the validation data include second training sensor data collected from second mobile cleaning robots, distinct from the first mobile cleaning robots, while performing cleaning missions in respective environments.

35. The method of claim 26, comprising updating the trained robot escape behavior model periodically or responsive to a trigger event.

36. The method of claim 26, comprising displaying on a user interface information about the stuck state and the robot escape behavior of the mobile cleaning robot from the stuck state.

* * * * *